(12) United States Patent
Huo et al.

(10) Patent No.: US 12,278,948 B2
(45) Date of Patent: *Apr. 15, 2025

(54) TRANSFORM METHOD AND DECODER

(71) Applicant: GUANGDONG OPPO MOBILE TELECOMMUNICATIONS CORP., LTD., Guangdong (CN)

(72) Inventors: Junyan Huo, Guangdong (CN); Xinwei Li, Guangdong (CN); Wenhan Qiao, Guangdong (CN); Yanzhuo Ma, Guangdong (CN); Shuai Wan, Guangdong (CN); Fuzheng Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 46 days.

This patent is subject to a terminal disclaimer.

(21) Appl. No.: 17/847,141

(22) Filed: Jun. 22, 2022

(65) Prior Publication Data

US 2022/0329786 A1 Oct. 13, 2022

Related U.S. Application Data

(63) Continuation of application No. PCT/CN2019/130847, filed on Dec. 31, 2019.

(51) Int. Cl.
*H04N 19/00* (2014.01)
*H04N 19/105* (2014.01)
(Continued)

(52) U.S. Cl.
CPC ......... *H04N 19/105* (2014.11); *H04N 19/159* (2014.11); *H04N 19/176* (2014.11); *H04N 19/18* (2014.11)

(58) Field of Classification Search
CPC .. H04N 19/105; H04N 19/159; H04N 19/176; H04N 19/18; H04N 19/61;
(Continued)

(56) References Cited

U.S. PATENT DOCUMENTS 10,200,719 B2 * 2/2019 Zhang .................. H04N 19/649
10,284,844 B1 5/2019 Zhao et al.
(Continued)

FOREIGN PATENT DOCUMENTS

CN 106254883 12/2016
CN 108141596 6/2018
(Continued)

OTHER PUBLICATIONS

JVET, Algorithm description for Versatile Video Coding and Test Model 7 (VTM 7) (Year: 2019).*
(Continued)

*Primary Examiner* — Philip P. Dang
(74) *Attorney, Agent, or Firm* — Hodgson Russ LLP

(57) ABSTRACT

A transform method and a decoder. The encoder determines a prediction mode parameter of a current block; determines a cross-component linear model (CCLM) parameter when the prediction mode parameter indicates that CCLM prediction is used for the current block to determine an intra prediction value; determines the intra prediction value of the current block according to the CCLM parameter, and calculates a residual value between the current block and the intra prediction value; determines a low-frequency non-separable transform (LFNST) transform kernel used for the current block according to the CCLM parameter, sets an LFNST index, and signals the LFNST index into a bitstream of a video, when LFNST is used for the current block; and transforms the residual value with the LFNST transform kernel.

3 Claims, 11 Drawing Sheets

(51) Int. Cl.
*H04N 19/159* (2014.01)
*H04N 19/176* (2014.01)
*H04N 19/18* (2014.01)
*H04N 19/625* (2014.01)

(58) Field of Classification Search
CPC .... H04N 19/96; H04N 19/157; H04N 19/186; H04N 19/593; H04N 19/70; H04N 19/12
See application file for complete search history.

(56) References Cited

U.S. PATENT DOCUMENTS

| | | | | |
|---|---|---|---|---|
| 10,419,757 | B2* | 9/2019 | Chen | H04N 19/124 |
| 10,652,575 | B2* | 5/2020 | Zhang | H04N 19/157 |
| 10,834,409 | B2* | 11/2020 | Yu | H04N 19/136 |
| 10,841,575 | B2* | 11/2020 | Panusopone | H04N 19/52 |
| 10,873,762 | B2* | 12/2020 | Zhao | H04N 19/124 |
| 10,951,884 | B2* | 3/2021 | Moon | H04N 19/573 |
| 10,986,343 | B2* | 4/2021 | Yu | H04N 19/174 |
| 11,051,021 | B2* | 6/2021 | Aono | H04N 19/117 |
| 11,146,796 | B2* | 10/2021 | Panusopone | H04N 19/174 |
| 11,196,998 | B2* | 12/2021 | Onno | H04N 19/105 |
| 11,218,716 | B2* | 1/2022 | Yu | H04N 19/159 |
| 11,284,097 | B2* | 3/2022 | Kim | H04N 19/105 |
| 11,297,351 | B2* | 4/2022 | Baylon | H04N 19/625 |
| 11,310,517 | B2* | 4/2022 | Jun | H04N 19/60 |
| 11,418,816 | B2* | 8/2022 | Hanhart | H04N 19/593 |
| 11,438,596 | B2* | 9/2022 | Kim | H04N 19/105 |
| 11,457,198 | B2* | 9/2022 | Hanhart | H04N 19/186 |
| 11,457,233 | B2* | 9/2022 | Yu | H04N 19/513 |
| 11,546,632 | B2* | 1/2023 | Koo | H04N 19/61 |
| 11,589,075 | B2* | 2/2023 | Koo | H04N 19/70 |
| 11,601,668 | B2* | 3/2023 | Yu | H04N 19/107 |
| 11,689,722 | B2* | 6/2023 | Bossen | H04N 19/119 375/240.03 |
| 2019/0306526 | A1 | 10/2019 | Cho et al. | |
| 2020/0366900 | A1* | 11/2020 | Jun | H04N 19/11 |
| 2021/0281842 | A1* | 9/2021 | Koo | H04N 19/18 |
| 2022/0394300 | A1* | 12/2022 | Koo | H04N 19/176 |
| 2023/0379472 | A1 | 11/2023 | Koo et al. | |

FOREIGN PATENT DOCUMENTS

| | | |
|---|---|---|
| CN | 108141597 | 6/2018 |
| CN | 109076222 | 12/2018 |
| WO | 2017192995 | 11/2017 |
| WO | 2019230670 | 12/2019 |
| WO | WO-2021034761 A1 * | 2/2021 ............ H04N 19/12 |

OTHER PUBLICATIONS

Goebel, J. "Low-Frequency Non-Separable Transform Hardware System Design for the WVC Encoder" (Year: 2022).*
Shao, X. "Type-II/III DCT/DST algorithms with reduced number of arithmetic operations" (Year: 2009).*
Bross et al., "Versatile Video Coding (Draft 5)", Joint Video Experts Team (JVET) of ITU-T SG 16 WP 3 and ISO/IEC JTC 1/SC 29/WG 11, JVET-N1001-v8, Mar. 2019.
EPO, Extended European Search Report for EP Application No. 19958280.0, Jan. 3, 2023.
Zhang et al., "Non-CE6: On LFNST transform set selection for a CCLM coded block," Joint Video Experts Team (JVET) of ITU-T SG 16 WP3 and ISO/IEC JTC 1/SC 29/WG 11, JVET-O0219-v1, Jul. 2019.
Lainema et al., "CE6-related: LFNST transform mapping," Joint Video Experts Team (JVET) of ITU-T SG 16 WP 3 and ISO/IEC JTC 1/SC 29/WG 11, JVET-P0197-v2, Oct. 2019.
WIPO, International Search Report and Written Opinion for International Application No. PCT/CN2019/130847, Sep. 27, 2020.
Bross et al., "Versatile Video Coding (Draft 5)," Joint Video Experts Team (JVET) of ITU-T SG 16 WP 3 and ISO/IEC JTC 1/SC 29/WG 11, Document: JVET-N1001-v10, Mar. 2019.
Chen et al., "Algorithm description for Versatile Video Coding and Test Model 5 (VTM 5)," Joint Video Experts Team (JVET) of ITU-T SG 16 WP 3 and ISO/IEC JTC 1/SC 29/WG 11, Document: JVET-N1002-v1, Mar. 2019.
EPO, Extended European Search Report for EP Application No. 19958506.8, Jan. 9, 2023.
USPTO, Non-Final Office Action for U.S. Appl. No. 17/807,671, Dec. 12, 2023.
Koo et al., "CE6: Reduced Secondary Transform (RST) (CE6-3.1)," Joint Video Experts Team (JVET) of ITU-T SG 16 WP 3 and ISO/IEC JTC 1/SC 29/WG 11, Document: JVET-N0193, Mar. 2019.
WIPO, International Search Report and Written Opinion for International Application No. PCT/CN2019/130850, Oct. 10, 2020.

* cited by examiner

TRANSFORM METHOD AND DECODER

CROSS-REFERENCE TO RELATED APPLICATION(S)

This application is a continuation of International Application No. PCT/CN2019/130847, filed Dec. 31, 2019, the entire disclosure of which is hereby incorporated by reference.

TECHNICAL FIELD

Implementations of the present application relate to the technical field of image processing, and in particular to a transform method and a decoder.

BACKGROUND

As increasing requirements of people on video display quality, new video application forms such as high-definition and ultra-high-definition video emerge. H.265/high efficiency video coding (HEVC) has been unable to meet needs of rapid developing video applications. Joint video exploration team (JVET) proposes the next-generation video coding standard H.266/versatile video coding (VVC), with a corresponding test model of VVC test model (VTM).

Currently, the reduced secondary transform (RST) technology has been accepted in H.266/VVC and is renamed as low-frequency non-separable transform (LFNST) technology. The LFNST technology mainly includes five steps: core parameter configuration, intra prediction mode mapping, transform matrix selection, matrix multiplication calculation, and primary transform coefficient matrix construction. Specifically, since the transform matrix in LFNST is related to the directional characteristics of the prediction mode, selection of the transform matrix is achieved by determining the transform set corresponding to the intra prediction mode. However, for non-traditional intra prediction modes such as the cross-component linear model (CCLM) prediction mode, it needs to be mapped to the traditional intra prediction mode before selection of the transform kernel candidate set. That is, the LFNST technology has poor applicability to the CCLM mode, and additional mapping complicates the transform process of the LFNST technology, thereby reducing encoding efficiency.

SUMMARY

Implementations of the present application provide a transform method and a decoder, which can improve applicability of a low-frequency non-separable transform (LFNST) technology to a cross-component linear model (CCLM) mode, simplify a transform process of the LFNST technology, and effectively improve encoding efficiency.

Technical solutions of the implementations of the present application can be achieved as follows.

In a first aspect, implementations of the present application provide a transform method. The transform method is for an encoder and includes the following.

A prediction mode parameter of a current block is determined. A CCLM parameter is determined when the prediction mode parameter indicates that CCLM prediction is used for the current block to determine an intra prediction value. The intra prediction value of the current block is determined according to the CCLM parameter, and a residual value between the current block and the intra prediction value is calculated. An LFNST transform kernel used for the current block is determined according to the CCLM parameter, an LFNST index is set, and the LFNST index is signalled into a bitstream of a video, when LFNST is used for the current block. The residual value is transformed with the LFNST transform kernel.

In a second aspect, implementations of the present application provide a transform method. The transform method is for a decoder and includes the following.

A bitstream is parsed to determine a prediction mode parameter of a current block. The bitstream is parsed to determine a CCLM parameter when the prediction mode parameter indicates that CCLM is used for the current block to determine an intra prediction value. The bitstream is parsed to determine a transform coefficient of the current block and an LFNST index. An LFNST transform kernel used for the current block is determined according to the CCLM parameter when the LFNST index indicates that LFNST is used for the current block. The transform coefficient is transformed with the LFNST transform kernel.

In a third aspect, implementations of the present application provide a decoder. The decoder includes at least one processor and a memory. The memory is coupled to the at least one processor and stores at least one computer executable instruction thereon which, when executed by the at least one processor, causes the at least one processor to execute the method of the second aspect.

DETAILED DESCRIPTION

Figure 1:
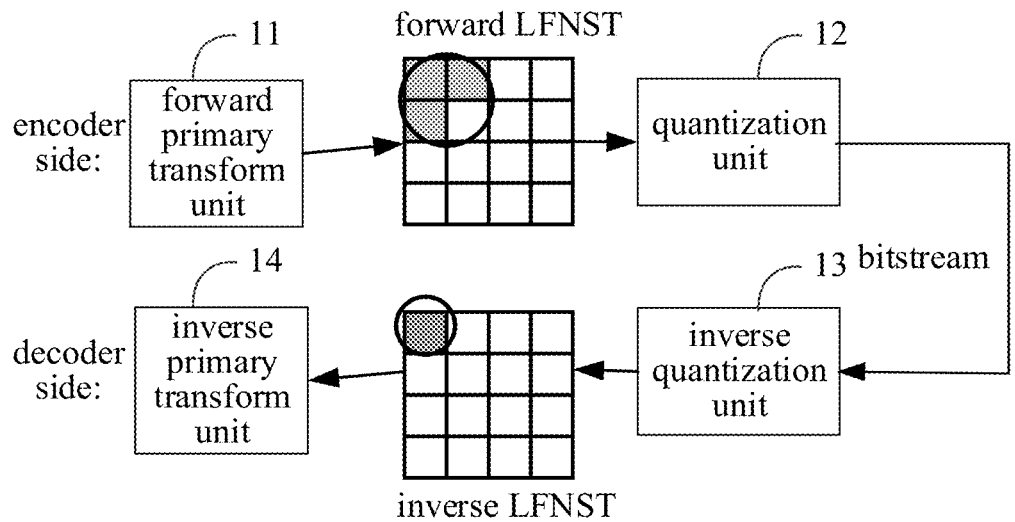
FIG. 1 is a schematic diagram of application of a low-frequency non-separable transform (LFNST) technology.

To better understand features and technical contents of implementations, the implementations will be described in detail below with reference to the accompanying drawings. The attached drawings are merely for reference and description, but are not used to limit the implementations.

In a picture of a video, a first colour component, a second colour component, and a third colour component are generally used to indicate a coding block (CB). These three colour components are respectively a luma component, a blue chroma component, and a red chroma component. Specifically, the luma component is generally represented by a symbol Y, the blue chroma component is generally represented by a symbol Cb or U, and the red chroma component is generally represented by a symbol Cr or V. In this way, the picture can be expressed in the format of YCbCr or YUV.

In the implementations of the present application, the first colour component is a luma component, the second colour component is a blue chroma component, and the third colour component is a red chroma component, which is not limited herein.

In H.266, to further improve encoding performance and encoding efficiency, cross-component prediction (CCP) is extended and improved, and cross-component linear model (CCLM) prediction is proposed. In H.266, CCLM achieves prediction from the first colour component to the second colour component, prediction from the first colour component to the third colour component, and prediction between the second colour component and the third colour component.

Specifically, in the implementations of the present application, when the CCLM method implements prediction from the luma component to the chroma component, to reduce redundancy between the luma component and the chroma component and between different chroma components, a cross-component linear model prediction mode is used in the next-generation video coding standard. For example, according to formula (1), a prediction value of chroma is constructed using a reconstructed luma value of the same coding block:

$$\text{Pred}_C[i,j] = \alpha \cdot \text{Rec}_L[i,j] + \beta \quad (1)$$

where i,j represents a position coordinate of a sample in the coding block, i represents the horizontal direction, j represents the vertical direction, $\text{Pred}_C[i,j]$ represents a prediction value of a second colour component of the sample having the position coordinate [i,j] in the coding block, and $\text{Rec}_L[i,j]$ represents a reconstructed value of a first colour component (after down-sampling) of the sample having the position coordinate [i,j] in the same coding block. α and β are ratio factors of the linear model, which can be derived by minimizing the regression error of neighbouring reference values of the first colour component and neighbouring reference values of the second colour component, as in the following formula (2).

$$\begin{cases} \alpha = \dfrac{N \cdot \sum (L(n) \cdot C(n)) - \sum L(n) \cdot \sum C(n)}{N \cdot \sum (L(n) \cdot L(n)) - \sum L(n) \cdot \sum L(n)} \\ \beta = \dfrac{\sum C(n) - \alpha \cdot \sum L(n)}{N} \end{cases} \quad (2)$$

where L(n) represents the neighbouring reference values (e.g., left and top) of the first colour component (after down-sampling), C(n) represents the neighbouring reference values (e.g., left and top) of the second colour component, and N is the number of the neighbouring reference values of the second colour component.

Specifically, in addition to the method of predicting the chroma component with the luma component, that is, the method of predicting the second colour component with the first colour component or the method of predicting the third colour component with the first colour component, the CCLM mode also includes prediction between two chroma components, i.e., also includes the prediction method between the second colour component and the third colour component. In the implementations of the present application, the Cr component can be predicted from the Cb component, and the Cb component can also be predicted from the Cr component.

It should be noted that, in the implementations of the present application, in CCLM, prediction between chroma components, that is, prediction between the second colour component and the third colour component, may be applied to the residual domain. Taking the prediction of the Cr component as an example, the Cb residual can be used to predict the Cr residual. A final prediction value of the Cr component is obtained by adding a weighted reconstructed Cb residual to the traditional intra prediction value of the Cr component, as illustrated in formula (3):

$$\text{Pred}^*_{Cr}[i,j] = \gamma \cdot \text{resi}_{Cb}'[i,j] + \text{Pred}_{Cr}[i,j] \quad (3)$$

where $\text{pred}^*_{Cr}[i,j]$ represents the final prediction value of the Cr component of the sample having the position coordinate [i,j] in the current coding block, and $\text{resi}_{Cb}'[i,j]$ is the reconstructed residual of the Cb component. The calculation method of the ratio factor γ is the same as the calculation method of the prediction model parameter from the luma component to the chroma component in CCLM, except that a regression cost related to the default value of γ in the error function is introduced, such that the obtained ratio factor γ biases towards the default value of −0.5. Specifically, the ratio factor γ can be calculated through formula (4).

$$\gamma = \frac{N \sum (Cb(n) \cdot Cr(n)) - \sum Cb(n) \cdot \sum Cr(n) + \lambda \cdot (-0.5)}{N \cdot \sum (Cb(n) \cdot Cb(n)) - \sum Cb(n) \cdot \sum Cb(n) + \lambda} \quad (4)$$

Cb(n) represents neighbouring reference Cb values of the current coding block, Cr(n) represents neighbouring reference Cr values of the current coding block, and can be an empirical value, for example, $\lambda = \Sigma(Cb(n) \cdot Cb(n))) >> 9$.

The reduced secondary transform (RST) technology proposed by LGE in joint video exploration team (JVET)-N0193 is accepted in H.266/versatile video coding (VVC) and is renamed as the low-frequency non-separable transform (LFNST) technology. In subsequent meetings, the LFNST technology is increasingly optimized as the standard develops. The following will describe the related technical solutions of the current LFNST technology.

FIG. 1 is a schematic diagram of application of an LFNST technology. Referring to FIG. 1, it illustrates a schematic diagram of a position of application of the LFNST technology provided in related technical solutions. As illustrated in FIG. 1, in the intra prediction mode, for an encoder side, the LFNST technology is applied between a forward primary transform unit 11 and a quantization unit 12, and the LFNST technology is applied between an inverse quantization unit 13 and an inverse primary transform unit 14.

Specifically, at the encoder side, firstly for data such as residual, first transform (or called "core transform", "primary transform", or "main transform") is performed through the forward primary transform unit 11, to obtain a transform coefficient matrix after the first transform. Then, LFNST (or called "secondary transform" or "second transform") is performed on coefficients in the transform coefficient matrix, to obtain an LFNST transform coefficient matrix. Finally, quantization is performed on the LFNST transform coefficient matrix through the quantization unit 12, and the final quantized value is signalled into a bitstream.

At a decoder side, by parsing the bitstream, the quantized value of the LFNST transform coefficient matrix can be obtained. The inverse quantization (or called "scaling") is performed on the quantized value through the inverse quantization unit 13, to obtain the restored value of the LFNST transform coefficient matrix. The inverse LFNST is performed on the restored value, to obtain the coefficient matrix. Then, through the inverse primary transform unit 14, inverse transform corresponding to the "core transform" at the encoder side is performed on the coefficient matrix, and finally the restored value of the residual is obtained. It should be noted that, only the "inverse transform" operation at the decoder side is defined in the standard, so the "inverse LFNST" is also called "LFNST" in the standard. In the implementations of the present application, for convenience of distinguishing from the transform at the encoder side, "LFNST" at the encoder side may be referred to as "forward LFNST", and "LFNST" at the decoder side may be referred to as "inverse LFNST".

That is, at the encoder side, forward primary transform is performed on the prediction residual of the current transform unit, to obtain primary transform coefficients. Then, some of the primary transform coefficients are subjected to secondary transform through matrix multiplication, to obtain fewer and more concentrated secondary transform coefficients, which are then quantized. At the decoder side, after the quantized value is obtained through parsing, inverse quantization is performed, and coefficients after the inverse quantization are subjected to inverse secondary transform through matrix multiplication. Then, coefficients after the inverse secondary transform are subjected to inverse primary transform, to restore the residual.

In the LFNST technology, the LFNST transform process may mainly include steps such as core parameter configuration, intra prediction mode mapping, transform matrix selection, matrix multiplication calculation/operation, and inverse primary transform coefficient matrix construction. After processing of these steps, the LFNST is completed. However, in the step of transform matrix selection, a transform set needs to be selected first. Since the transform matrix is related to the directional characteristic of the prediction mode, currently, the transform set is selected according to the intra prediction mode. For the traditional intra prediction mode, a value of an intra prediction mode indicator may be determined according to the number (No.) of the traditional intra prediction mode, and then a transform set index may be determined according to the value of the intra prediction mode indicator.

Figure 2:
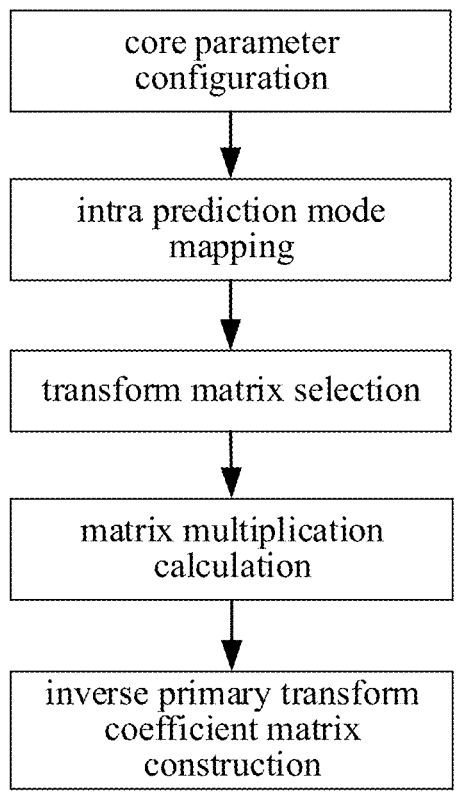
FIG. 2 is a flow chart of a specific process of LFNST.

Specifically, FIG. 2 is a flow chart of a specific process of LFNST. As illustrated in FIG. 2, the specific process of LFNST can include five steps of: core parameter configuration, intra prediction mode mapping, transform matrix selection, matrix multiplication calculation, and inverse primary transform coefficient matrix construction. For intra prediction mode mapping, this step is performed to determine a value of predModeIntra, which may mainly include: non-traditional intra prediction mode mapping and wide-angle mapping. For transform matrix selection, this step is performed to select a transform set and a transform matrix, which may mainly include: selecting a transform set, selecting a transform matrix group category, and selecting a transform matrix size.

For core parameter configuration, it is first necessary to configure the length (which can be represented by nonZeroSize) of the input secondary transform coefficient vector and the length (which can be represented by nLfnstOutSzie) of the output primary transform coefficient vector for LFNST calculation.

In addition, the parameter nLfnstSize needs to be configured, indicating that there is a primary transform coefficient only in the range of the first nLfnstSize×nLfnstSize in the current block. In this case, by parsing the bitstream, the intra prediction mode of the luma component or chroma component of the current block or the coding block where the current block locates can also be obtained. In this case, the value of the intra prediction mode indicator (which can be represented by predModeIntra) can be determined.

Furthermore, obtain the vector u[i] of the secondary transform coefficient, where i=0, 1, . . . , nonZeroSize−1. When it is determined that LFNST is used for the current transform unit, coefficient d[x][y] after inverse quantization is the secondary transform coefficient. Obtain the first nonZeroSize values in the diagonal scan order, which are the vector u[i] of the secondary transform coefficient, where i=0, 1, . . . , nonZeroSize−1.

Furthermore, for mapping of the intra prediction mode, the intra prediction mode includes the traditional intra prediction mode and the non-traditional intra prediction mode. For the non-traditional intra prediction mode, information indicated by the value of predModeIntra is as follows.

If the value of predModeIntra is INTRA_LT_CCLM, INTRA_L_CCLM, or INTRA_T_CCLM (respectively 81, 82, 83 in VVC), it indicates that the prediction mode of the current block is the CCLM mode.

If intra_mip_flag[xTbY][yTbY] is equal to 1 and cIdx is equal to 0, it indicates that the prediction mode of the current block is the matrix-based intra prediction (MIP) mode. In this case, the value of predModeIntra indicates the used MIP mode index modeId.

If it is not the above two cases, the value of predModeIntra can be ranged in [0, 66], indicating that the prediction mode of the current block is the traditional intra prediction mode.

Currently, when the LFNST transform kernel candidate set index is determined according to the number of the traditional intra prediction mode by parsing the bitstream, if the prediction mode of the current block is the CCLM mode or the MIP mode, that is, the current block is in the non-traditional intra prediction mode, the value of predModeIntra is mainly set as follows.

(1) When the value of predModeIntra indicates INTRA_LT_CCLM, INTRA_L_CCLM or INTRA_T_CCLM (respectively 81, 82, 83 in VVC),
   if the mode of the luma block at the center of the luma position corresponding to the current block (such as the chroma block) is the MIP mode, that is, intra_mip_flag [xTbY+nTbW/2][yTbY+nTbH/2] is 1, then a value of predMode Intra is set to the index (i.e., 0) indicating the PLANAR mode;
   otherwise, if the mode of the luma block at the center of the luma position corresponding to the current block (such as the chroma block) is the intra block copy (IBC) mode or the Palette (PLT) mode, the value of predModeIntra is set to the index (i.e., 1) indicating the direct current (DC) mode;
   otherwise, the value of predModeIntra is set to the value IntraPredModeY[xTbY+nTbW/2][yTbY+nTbH/2] of the mode index of the luma block at the center of the luma position corresponding to the current block (such as the chroma block).

(2) When itra_mip_flag[xTbY][yTbY] is equal to 1 and cIdx is equal to 0, that is, the prediction mode of the current block is the MIP mode, the value of predModeIntra can be directly set as the index (i.e., 0) indicating the PLANAR mode.

For the traditional intra prediction mode (such as wide-angle mapping), in the process of parsing the bitstream, wide-angle mapping can also be performed according to the size of the current block, and the traditional intra prediction mode [0, 66] can be extended to [−14, 80]. The specific mapping process is as follows.

First, calculate the width-height ratio factor (denoted by whRatio). For a non-square current block (that is, nTbW is not equal to nTbH), the value of predModeIntra can be modified as follows. If nTbW is greater than nTbH, and predModeIntra is greater than or equal to 2 and predModeIntra is less than ((whRatio>1?(8+2×whRatio):8), then predModeIntra=(predModeIntra+65). Otherwise, if nTbW is less than nTbH, and predModeIntra is less than or equal to 66 and predModeIntra is greater than ((whRatio>1?(60−2×whRatio):60), then predModeIntra=(predModeIntra-67).

In the current H.266/VVC, the value of the LFNST index (denoted by SetIdx) can be determined according to the value of predModeIntra. Specifically, the value of the LFNST index is set such that the value of the LFNST index indicates that LFNST is used for the current block and indicates an index of the LFNST transform kernel in the LFNST transform kernel candidate set. Generally, the LFNST transform set includes four transform kernel candidate sets (set0, set1, set2, set3), with respective SetIdx values of 0, 1, 2, 3.

It should be understood that, in the implementations of the present application, since the LFNST transform matrix is related to the directional characteristics of the prediction mode, for the non-traditional intra prediction mode such as the CCLM mode, since selection of the transform set cannot be performed, it needs to be mapped to the traditional intra prediction mode first. Specifically, during mapping, the value of predModeIntra is set mainly based on the intra prediction mode of the luma block at the center of the luma position corresponding to the chroma transform unit. That is, currently, if the intra prediction mode of the luma block at the center of the luma position corresponding to the chroma transform unit is the MIP mode, the CCLM mode can be mapped to the PLANAR. If the intra prediction mode of the luma block at the center of the luma position corresponding to the chroma transform unit is the IBC mode or the PLT mode, the CCLM mode may be mapped to DC. If the intra prediction mode of the luma block at the center of the luma position corresponding to the chroma transform unit is the traditional intra prediction mode, proceed to perform wide-angle mapping according to the size of the current chroma transform unit. Then, the selection of the transform kernel candidate set is performed according to the mapped angle.

Figure 3:
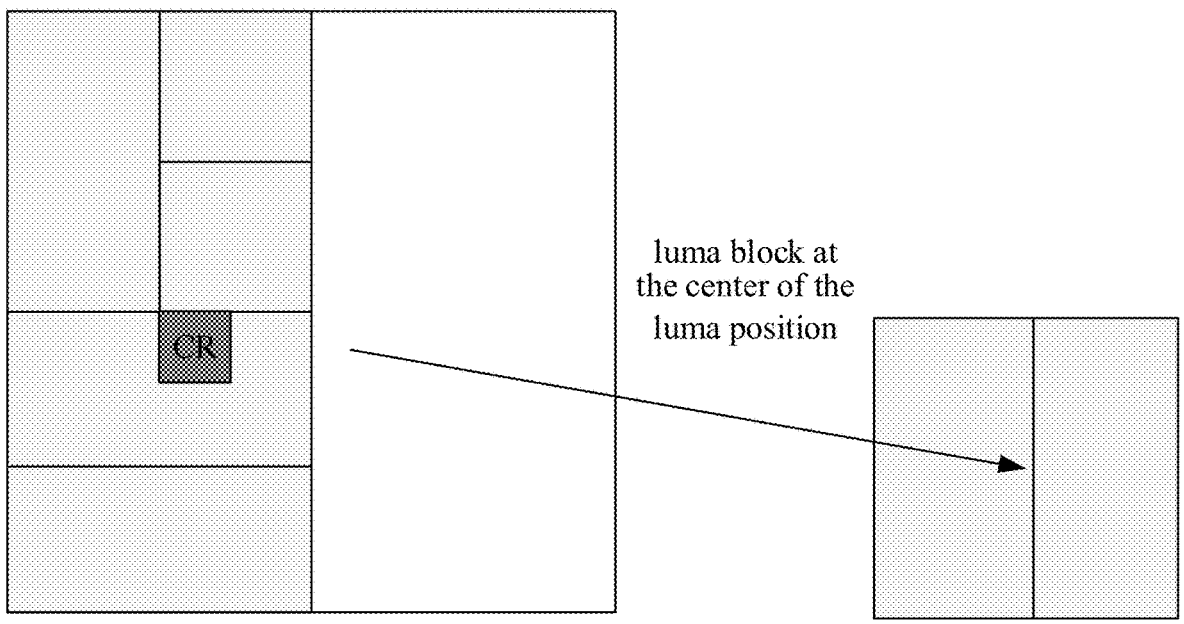
FIG. 3 is a schematic diagram of a luma block at the center of a luma position.

However, when the non-traditional intra prediction mode is mapped using the above method, the following is discussed. On the one hand, if the CCLM mode is used for the current chroma transform unit, the characteristic of the luma block at the center of the luma position corresponding to the chroma transform unit cannot represent the characteristic of the current chroma transform unit, so it is unreasonable to perform selection of the transform kernel candidate set according to this characteristic. On the other hand, although the chroma block using CCLM is predicted from the corresponding luma block with a linear relationship, the luma block at the center of the luma position corresponding to the chroma transform unit may merely be a sub-block of the corresponding luma block, which cannot represent the characteristic of the entire corresponding luma block. For example, FIG. 3 is a schematic diagram of a luma block at the center of a luma position. As illustrated in FIG. 3, the right one is the chroma block, and the left one is the luma block at the collocated position. For the left gray sub-block of the chroma block, the block at the center (CR) position of the left sub-block of the luma block is indicated as a dark block. The obtained mode of the luma block is merely the mode of the dark block, which cannot represent the overall characteristics of the gray block in the left block. On the other hand, the approach of existing schemes introduces the dependency between chroma and luma in the transform process. Finally, since the luma and the chroma support different intra prediction modes, when the intra prediction mode of the luma block at the center of the luma position corresponding to the chroma transform unit is not supported in the chroma block, such as MIP, IBC, PLT mode, additional mapping is also required.

That is, for the current H.266/VVC, it is necessary to map the CCLM mode to the traditional intra prediction mode before selection of the transform kernel candidate set. However, the above mapping manner has poor accuracy and may introduce new mapping. It can be seen that, the current LFNST technology has poor applicability to the CCLM mode, and additional mapping complicates the transform process of the LFNST technology, thereby reducing encoding efficiency.

To overcome the above drawbacks, in the implementations of the present application, when performing transform on the current block on which intra prediction is performed using the CCLM mode, a codec does not need to map the CCLM mode to the traditional intra prediction mode. Instead, the codec can determine the LFNST transform kernel used for the current block directly according to the CCLM parameter corresponding to the current block, so that the LFNST transform kernel can be used to perform LFNST. Understandably, since the CCLM parameter is introduced in LFNST, selection of the LFNST transform kernel is more flexible, which can improve the applicability of the LFNST technology to the CCLM mode, and simplify the transform process of the LFNST technology, effectively improving the encoding efficiency.

Figure 4:
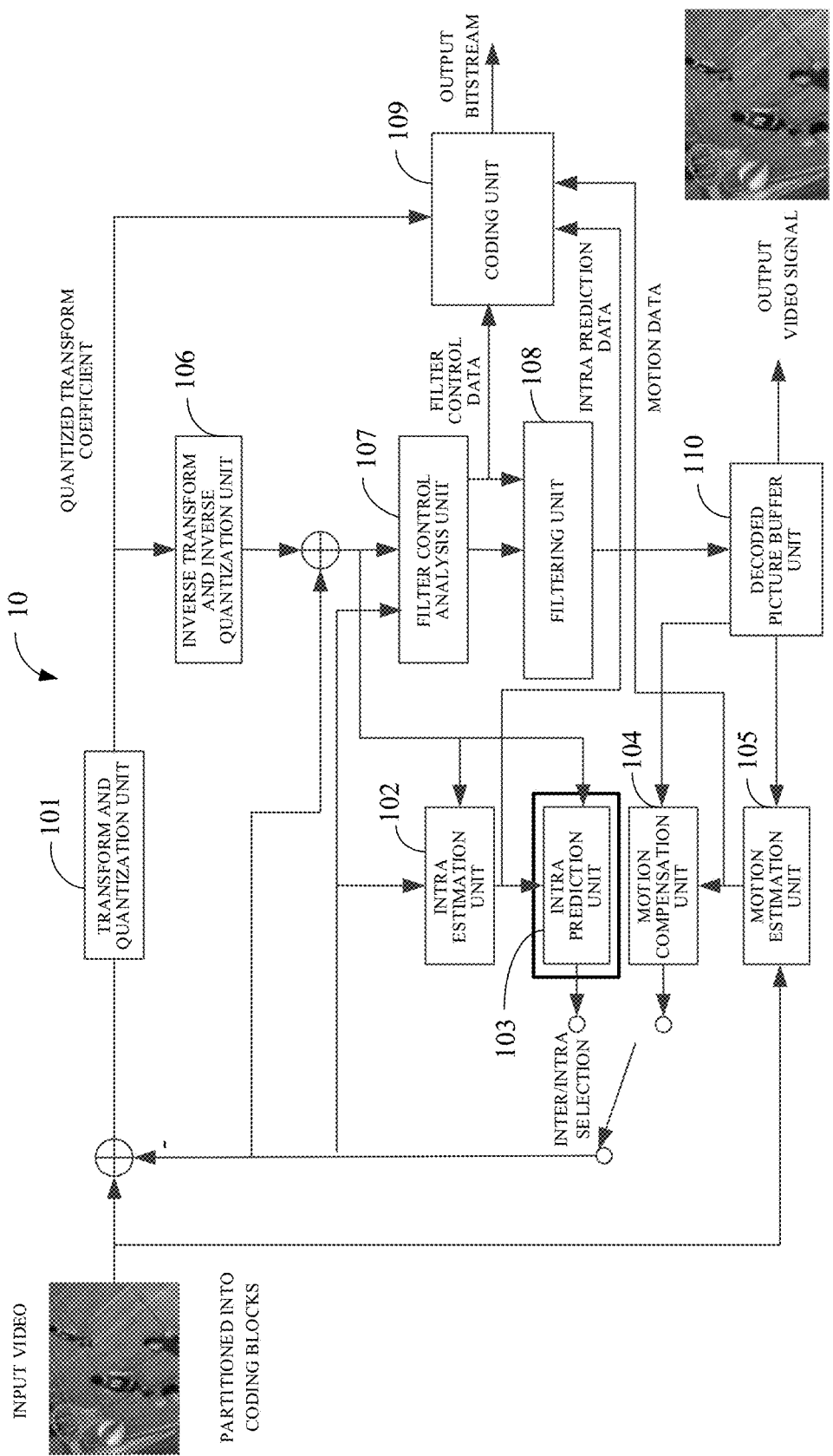
FIG. 4 is a block diagram of a structure of a video encoding system.

It should be noted that, in the implementations of the present application, FIG. 4 is a block diagram of a structure of a video encoding system. Referring to FIG. 4, it illustrates an example of the block diagram of the structure of the video encoding system provided in the implementations of the present application. As illustrated in FIG. 4, the video encoding system 10 includes a transform and quantization unit 101, an intra estimation unit 102, an intra prediction unit 103, a motion compensation unit 104, a motion estimation unit 105, an inverse transform and inverse quantization unit 106, a filter control analysis unit 107, a filtering unit 108, a coding unit 109, and a decoded picture buffer unit 110, etc. The filtering unit 108 can implement deblocking filtering and sample adaptive offset (SAO) filtering, and the coding unit 109 can implement header information encoding and context-based adaptive binary arithmetic coding (CABAC). For an input original video signal, one coding block of a video can be obtained through partition of a coding tree unit (CTU). Then, for the residual sample information obtained after intra prediction or inter prediction, the coding block is transformed by the transform and quantization unit 101, including transforming the residual information from the sample domain to the transform domain, and the obtained transform coefficients are quantized, to further reduce the bit rate. The intra estimation unit 102 and the intra prediction unit 103 are used to perform intra prediction on the coding block. Specifically, the intra estimation unit 102 and the intra prediction unit 103 are used to determine an intra prediction mode to-be-used to encode the coding block. The motion compensation unit 104 and the motion estimation unit 105 are used to perform inter prediction on the received coding block relative to one or more blocks in one or more reference pictures, to provide temporal prediction information. The motion estimation performed by the motion estimation unit 105 is a process of generating a motion vector, where the motion vector can estimate motion of the coding block. The motion compensation unit 104 is used to perform motion compensation based on the motion vector determined by the motion estimation unit 105. After the intra prediction mode is determined, the intra prediction unit 103 is used to provide the selected intra prediction data to the coding unit 109 and the motion estimation unit 105 is used to send the calculated motion vector data to the coding unit 109. In addition, the inverse transform and inverse quantization unit 106 is used for reconstruction of the coding block. A residual block is reconstructed in the sample domain, and blockiness artifacts of the reconstructed residual block are removed through the filter control analysis unit 107 and the filtering unit 108, and then the reconstructed residual block is added to a prediction of the picture in the decoded picture buffer unit 110, to generate a reconstructed coding block. The coding unit 109 is used to encode various coding parameters and quantized transform coefficients. In the CABAC-based encoding algorithm, the context can be based on neighbouring coding blocks, and the coding unit 109 can be used to encode information indicating the determined intra prediction mode and output the bitstream of the video signal. The decoded picture buffer unit 110 is used to store reconstructed coding blocks, for prediction reference. As the picture encoding progresses, reconstructed coding blocks will be continuously generated, and these reconstructed coding blocks will be stored into the decoded picture buffer unit 110.

Figure 5:
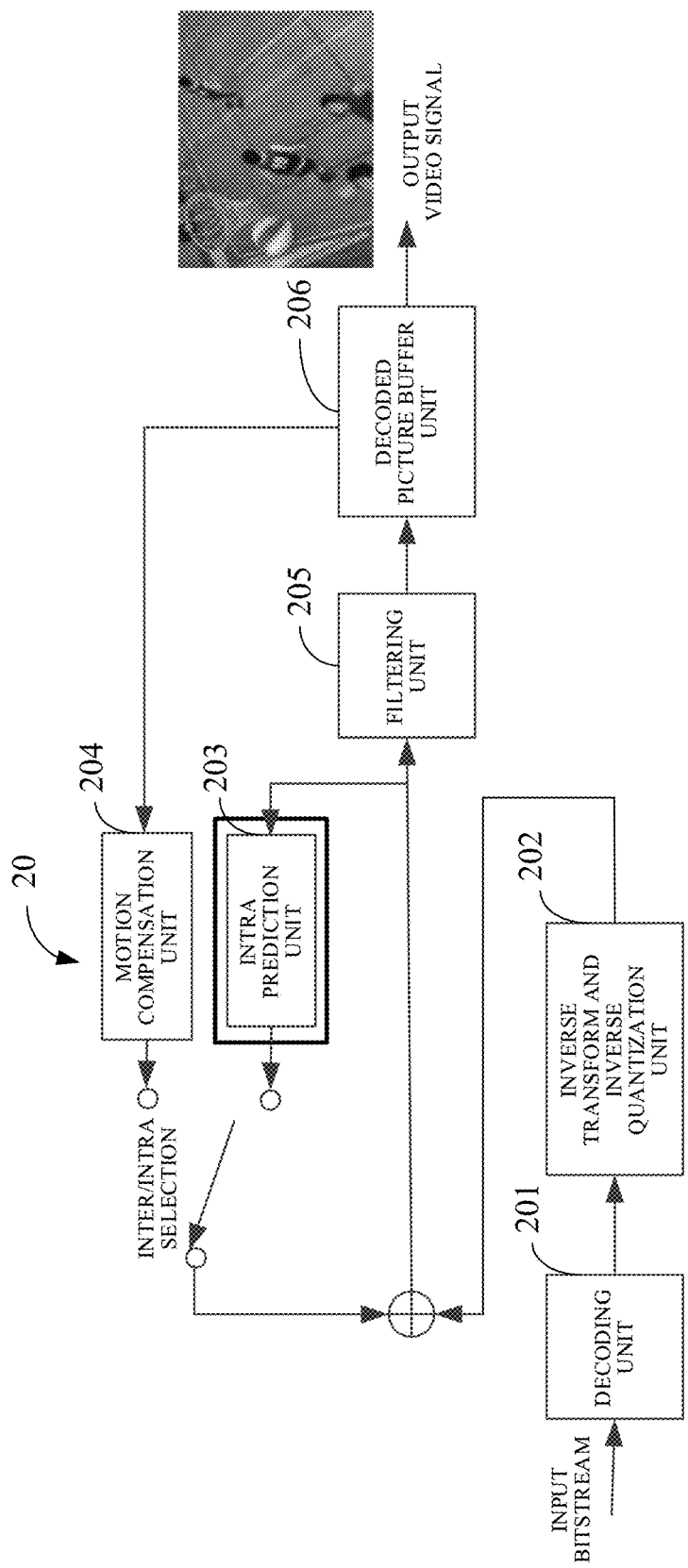
FIG. 5 is a block diagram of a structure of a video decoding system.

FIG. 5 is a block diagram of a structure of a video decoding system. Referring to FIG. 5, it illustrates an example of the block diagram of the structure of the video decoding system provided in the implementations of the present application. As illustrated in FIG. 5, the video decoding system 20 includes a decoding unit 201, an inverse transform and inverse quantization unit 202, an intra prediction unit 203, a motion compensation unit 204, a filtering unit 205, a decoded picture buffer unit 206, and the like. The decoding unit 201 can implement header information decoding and CABAC, and the filtering unit 205 can implement deblocking filtering and SAO filtering. After the input video signal is encoded (as illustrated in FIG. 4), the bitstream of the video signal is output. The bitstream is input into the video decoding system 20. First, decoded transform coefficients are obtained through the decoding unit 201. The decoded transform coefficients are processed by the inverse transform and inverse quantization unit 202, so as to generate a residual block in the sample domain. The intra prediction unit 203 may be used to generate prediction data of the current coding block of the video based on the determined intra prediction mode and data from the previous decoded block of the current frame or picture. The motion compensation unit 204 is used to determine prediction information for the coding block by analyzing motion vectors and other associated syntax elements, and use the prediction information to generate a prediction of the coding block that is being decoded. The decoded block is formed by summing the residual block from the inverse transform and inverse quantization unit 202 and the corresponding prediction generated by the intra prediction unit 203 or the motion compensation unit 204. The blockiness artifacts of the decoded video signal are removed through the filtering unit 205, which can improve quality of the video. The decoded block is then stored into the decoded picture buffer unit 206. The decoded picture buffer unit 206 is used to store reference pictures used for subsequent intra prediction or motion compensation, and is also used to output the video signal, that is, the restored original video signal is obtained.

The transform method in the implementations of the present application can be applied to the transform and quantization unit 101 illustrated in FIG. 4, where the transform and quantization unit 101 includes the forward primary transform unit 11 and the quantization unit 12 illustrated in FIG. 1. In this case, the transform method is specifically applied to the part between transform and quantization. In addition, the transform method in the implementations of the present application can be applied to the inverse transform and inverse quantization unit 106 illustrated in FIG. 4 or the inverse transform and inverse quantization unit 202 illustrated in FIG. 5, where the inverse transform and inverse quantization unit 106 and the inverse transform and inverse quantization unit 202 each may include the inverse quantization unit 13 and the inverse primary transform unit 14 illustrated in FIG. 1. In this case, the transform method is specifically applied to the part between inverse quantization and inverse transform. That is, the transform method in the implementations of the present application may be applied to the video encoding system, or applied to the video decoding system, or even applied to both the video encoding system and the video decoding system. However, the implementations of the present application are not specifically limited. It should also be noted that, when the transform method is applied to the video encoding system, the "current block" specifically refers to a current coding block in intra prediction; when the transform method is applied to the video decoding system, the "current block" specifically refers to a current coding block in intra prediction.

The technical solutions in the implementations of the present application will be clearly and completely described below with reference to the accompanying drawings in the implementations of the present application.

Figure 6:
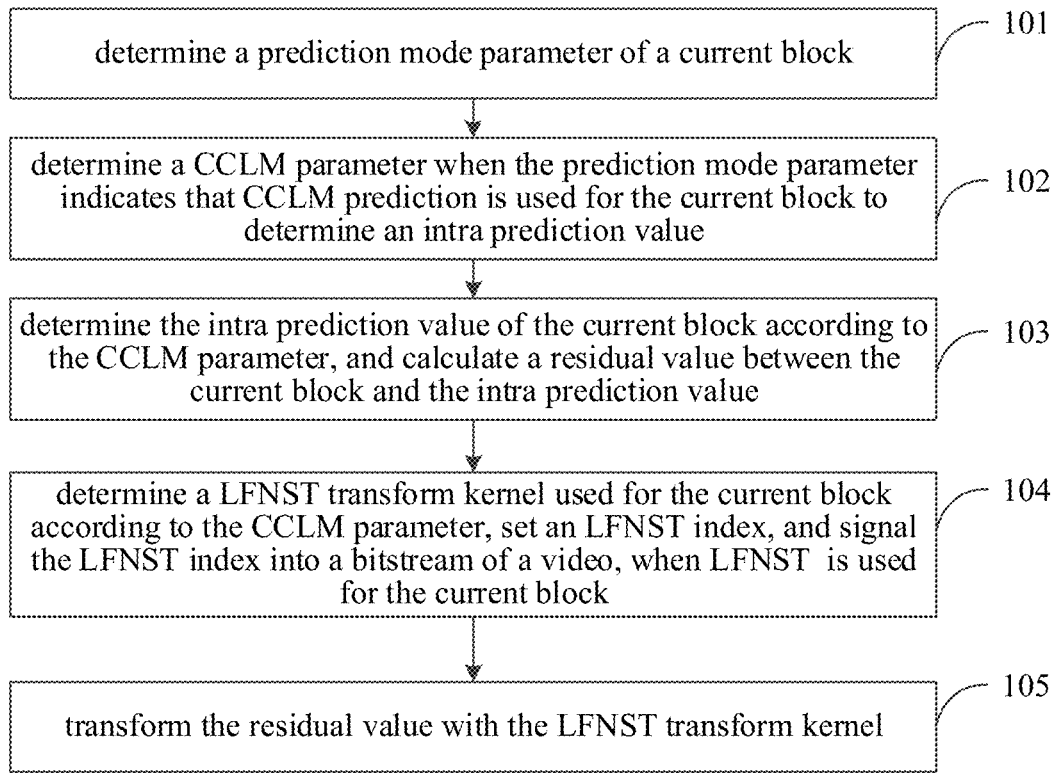
FIG. 6 is schematic diagram 1 of an implementation procedure of a transform method.

An implementation of the present application provides a transform method, which is applied to an encoder. FIG. 6 is schematic diagram 1 of an implementation procedure of a transform method. As illustrated in FIG. 6, the transform method performed by the encoder may include the following steps.

Step 101, a prediction mode parameter of a current block is determined.

In the implementations of the present application, the encoder can first determine the prediction mode parameter of the current block.

It should be noted that, in the implementations of the present application, a picture of a video can be partitioned into multiple picture blocks, and each picture block currently to be encoded can be called a CB. Herein, each coding block may include a first colour component, a second colour component, and a third colour component. The current block is a coding block in the picture of the video for which prediction of the first colour component, the second colour component, or the third colour component is currently to be performed.

It can be understood that, in the implementations of the present application, assuming that prediction of the first colour component is performed for the current block, and the first colour component is a luma component, that is, the colour component to be predicted is a luma component, the current block may also be called a luma block. Alternatively, assuming that prediction of the second colour component is performed for the current block, and the second colour component is a chroma component, that is, the colour component to be predicted is a chroma component, the current block may also be called a chroma block.

It should be noted that, in the implementations of the present application, the prediction mode parameter indicates the coding mode of the current block and parameters related to this mode. Generally, rate distortion optimization (RDO) can be used to determine the prediction mode parameter of the current block.

Furthermore, in the implementations of the present application, the coding mode may include two categories of traditional intra prediction mode and non-traditional intra prediction mode. Specifically, the traditional intra prediction mode may include DC mode, PLANAR mode, angle mode, and the like. The non-traditional intra prediction mode may include MIP mode, CCLM mode, IBC mode, PLT mode, and the like.

That is, in the implementations of the present application, the encoder may determine, through the prediction mode parameter, which one (the traditional intra prediction mode or the non-traditional intra prediction mode) is the coding mode of the current block.

In the implementations of the present application, furthermore, when the encoder determines the prediction mode parameter of the current block, it may first determine the colour component to be predicted of the current block. Then, based on the parameter of the current block, the encoder uses multiple prediction modes to respectively perform prediction on the colour component to be predicted, and calculates the rate distortion optimization result corresponding to each prediction mode in the multiple prediction modes. Finally, the encoder can select the smallest rate distortion optimization result from calculated multiple rate distortion optimization results, and determine the prediction mode corresponding to the smallest rate distortion optimization result as the prediction mode parameter of the current block.

That is, at the encoder side, for the current block, multiple prediction modes can be adopted to respectively encode the colour component to be predicted. Herein, the multiple prediction modes generally include the traditional intra prediction mode and the non-traditional intra prediction mode.

Furthermore, in the implementations of the present application, after encoding the current block with multiple prediction modes respectively, the encoder can obtain the rate distortion optimization result corresponding to each prediction mode. Then, the encoder selects the smallest rate distortion optimization result from the obtained multiple rate distortion optimization results, and determines the prediction mode corresponding to the smallest rate distortion optimization result as the prediction mode parameter of the current block. In this way, finally, the encoder can use the determined prediction mode to encode the current block. In this prediction mode, the residual can be small, and the encoding efficiency can be improved.

Step 102, a CCLM parameter is determined when the prediction mode parameter indicates that CCLM prediction is used for the current block to determine an intra prediction value.

In the implementations of the present application, after the encoder determines the prediction mode parameter of the current block, if the prediction mode parameter indicates that CCLM is used for the current block to determine the intra prediction value, the encoder can proceed to determine the CCLM parameter.

It is to be noted that, in the implementations of the present application, the CCLM parameter includes a CCLM mode index, where the CCLM mode index indicates a CCLM mode used for the current block, and the CCLM mode indicates the use of CCLM to determine a calculation derivation manner of the intra prediction value of the current block.

It can be understood that, in the implementations of the present application, specifically, the CCLM mode may include various different prediction modes. Therefore, it is necessary to use different indexes to mark and distinguish different prediction modes in the CCLM mode. That is, different CCLM modes correspond to different CCLM mode indexes.

Furthermore, in the implementations of the present application, when the encoder determines the calculation derivation manner of the intra prediction value of the current block by using the CCLM parameter, it can determine the specific CCLM mode, and thus can obtain the corresponding CCLM mode index.

It is to be noted that, in the implementations of the present application, the CCLM mode index may specifically include 81, 82, and 83.

It can be understood that, in the present application, after the encoder determines the CCLM parameter, it also needs to signal or write the determined CCLM parameter into the bitstream, so as to facilitate subsequent parsing at the decoder side.

Step 103, the intra prediction value of the current block is determined according to the CCLM parameter, and a residual value between the current block and the intra prediction value is calculated.

In the implementations of the present application, after the encoder determines the CCLM parameter corresponding to the current block, it can employ the CCLM parameter to further determine the intra prediction value of the current block, and then calculate the residual value between the current block and the intra prediction value.

It is to be noted that, in the implementations of the present application, after the encoder determines the CCLM parameter, it can employ the CCLM mode index contained in the CCLM parameter to determine the CCLM mode used for the current block, and then obtain the calculation derivation manner of the intra prediction value of the current block determined with CCLM.

For example, in the implementations of the present application, when the encoder determines the intra prediction value of the current block according to the CCLM parameter, through the above formula (1), it employs the reconstructed value $\text{Rec}_L[i,j]$ of the first colour component (after down-sampling) of the sample having the position coordinate [i,j] in the coding block, to calculate the prediction value $\text{Pred}_C[i,j]$ of the second colour component of the sample having the position coordinate [i,j] in the coding block.

For example, in the implementations of the present application, after determining the intra prediction value of the current block, the encoder can proceed to calculate the difference between the actual pixel value of the current block and the intra prediction value, and use the calculated difference as the residual value, so as to facilitate subsequent transform processing on the residual value.

It can be understood that, in the implementations of the present application, during using the CCLM mode to determine the intra prediction value, the encoder can further determine the CCLM parameter, so as to determine the LFNST transform kernel (which can be represented by "kernel") used for the current block according to the CCLM parameter in the subsequent processing process.

Step 104, an LFNST transform kernel used for the current block is determined according to the CCLM parameter, an LFNST index is set, and the LFNST index is signalled into a bitstream of a video, when LFNST is used for the current block.

In the implementations of the present application, if the LFNST technology is used for the current block, the encoder can further determine the LFNST transform kernel used for the current block according to the CCLM parameter, and then set the LFNST index and signal it into the bitstream of the video.

It should be noted that, in the implementations of the present application, LFNST does not apply to any current block. Specifically, LFNST can be performed on the current block only when the current block satisfies certain preset conditions at the same time. The preset conditions may include: (a) the width and height of the current block are both greater than or equal to 4; (b) the width and height of the current block are both less than or equal to the maximum size of the transform unit; (c) the prediction mode of the current block or the coding block where the current block locates is the intra prediction mode; (d) the primary transform of the current block is the two-dimensional forward primary transform (e.g., two-dimensional discrete cosine transform, DCT2) in both the horizontal and vertical directions; (e) the intra prediction mode of the current block or the coding block where the current block locates is the non-MIP mode, or the prediction mode of the transform unit is the MIP mode and the width and height of the transform unit are both greater than or equal to 16. That is, for the current block of the implementations of the present application, it is determined that the LFNST technology is used for the current block only when all the above five conditions are satisfied.

Furthermore, in the implementations of the present application, after determining that the LFNST technology can be used for the current block, there is also a need to determine the LFNST transform kernel (which can be represented by "kernel") used for the current block. There are four transform kernel candidate sets in LFNST, and these four transform kernel candidate sets can include set0, set1, set2 and set3. According to the coding parameter of the current block or the coding block where the current block locates, the selected transform kernel candidate set can be implicitly derived. For example, in the current H.266/VVC, according to the intra prediction mode of the current block, it can be determined which one among the four transform kernel candidate sets to use.

Specifically, in the implementations of the present application, after the intra prediction mode of the current block is obtained, the encoder can determine the value of the intra prediction mode indicator (which can be denoted by predModeIntra). The calculation formula is as follows.

$$\text{predModeIntra}=(\text{cIdx}=0)?\text{IntraPredModeY}[\text{xTbY}][\text{yTbY}]:\text{IntraPredModeC}[\text{xTbY}][\text{yTbY}] \quad (5)$$

The colour component indicator (which can be denoted by cIdx) is used to indicate the luma component or the chroma component of the current block. Herein, if the current block predicts the luma component, cIdx is equal to 0; if the current block predicts the chroma component, then cIdx is equal to 1. In addition, (xTbY, yTbY) is the coordinate of the sample at the top-left corner of the current block, IntraPredModeY[xTbY][yTbY] is the intra prediction mode of the luma component, and IntraPredModeC[xTbY][yTbY] is the intra prediction mode of the chroma component.

In the current H.266/VVC, the intra prediction mode may include the traditional intra prediction mode and the non-traditional intra prediction mode. For the non-traditional intra prediction mode, the information indicated by the value of predModeIntra is as follows.

If the prediction mode of the current block is the CCLM mode, the value of predModeIntra can be INTRA_LT_CCLM, INTRA_L_CCLM, or INTRA_T_CCLM (81, 82, 83 respectively in VVC).

If the prediction mode of the current block is the MIP mode, the value of predModeIntra may be the used MIP mode index.

If the prediction mode of the current block is the traditional intra prediction mode, the value of predModeIntra can be in [0, 66].

Furthermore, if the prediction mode of the current block is the CCLM mode or the MIP mode, the encoder can also set the value of predModeIntra in the following manner.

(1) When the prediction mode of the current block is the CCLM mode:
  if the mode of the luma block at the center of the luma position corresponding to the current block (such as the chroma block) is the MIP mode, that is, intra_mip_flag [xTbY+nTbW/2][yTbY+nTbH/2] is 1, then a value of predMode Intra is set to the index (i.e., 0) indicating the PLANAR mode;
  otherwise, if the mode of the luma block at the center of the luma position corresponding to the current block (such as the chroma block) is the IBC mode or the PLT mode, the value of predModeIntra is set to the index (i.e., 1) indicating the direct current (DC) mode;
  otherwise, the value of predModeIntra is set to the value IntraPredModeY[xTbY+nTbW/2][yTbY+nTbH/2] of the mode index of the luma block at the center of the luma position corresponding to the current block (such as the chroma block).

(2) When the prediction mode of the current block is the MIP mode:
  the value of predModeIntra can be directly set as the index (i.e., 0) indicating the PLANAR mode.

For the traditional intra prediction mode (such as wide-angle mapping), wide-angle mapping can also be performed according to the size of the current block, and the traditional intra prediction mode [0, 66] can be extended to [−14, 80]. The specific mapping process is as follows.

First, calculate the width-height ratio factor (denoted by whRatio), as illustrated in the following.

whRatio=Abs(Log 2(nTbW/nTbH))  (6)

For a non-square current block (that is, nTbW is not equal to nTbH), predModeIntra can be modified as follows. If nTbW is greater than nTbH, and predModeIntra is greater than or equal to 2 and predModeIntra is less than ((whRatio>1?(8+2×whRatio):8), then predModeIntra=(predModeIntra+65). Otherwise, if nTbW is less than nTbH, and predModeIntra is less than or equal to 66 and predModeIntra is greater than ((whRatio>1?(60−2×whRatio):60), then predModeIntra=(predModeIntra−67).

In the current H.266/VVC, the value of the LFNST index (denoted by SetIdx) can be determined according to the value of predModeIntra and Table 1, where the specific value is illustrated in Table 1. Herein, the value of the LFNST index is set such that the value of the LFNST index indicates that LFNST is used for the current block and indicates an index of the LFNST transform kernel in the LFNST transform kernel candidate set. Generally, the LFNST transform set includes four transform kernel candidate sets (set0, set1, set2, set3), with respective SetIdx values of 0, 1, 2, 3.

TABLE 1

| predModeIntra | SetIdx |
| --- | --- |
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

It should be understood that, in the implementations of the present application, since the LFNST transform matrix is related to the directional characteristics of the prediction mode, for the non-traditional intra prediction mode such as the CCLM mode, since selection of the transform set cannot be performed, it needs to be mapped to the traditional intra prediction mode first. Specifically, during mapping, the value of predModeIntra is set mainly based on the intra prediction mode of the luma block at the center of the luma position corresponding to the chroma transform unit. That is, currently, if the intra prediction mode of the luma block at the center of the luma position corresponding to the chroma transform unit is the MIP mode, the CCLM mode can be mapped to the PLANAR. If the intra prediction mode of the luma block at the center of the luma position corresponding to the chroma transform unit is the IBC mode or the PLT mode, the CCLM mode may be mapped to DC. If the intra prediction mode of the luma block at the center of the luma position corresponding to the chroma transform unit is the traditional intra prediction mode, proceed to perform wide-angle mapping according to the size of the current chroma transform unit. Then, the selection of the transform kernel candidate set is performed according to the mapped angle.

That is, for the current H.266/VVC, it is necessary to map the CCLM mode to the traditional intra prediction mode before selection of the transform kernel candidate set. However, the above mapping manner has poor accuracy and may introduce new mapping. It can be seen that, the current LFNST technology has poor applicability to the CCLM mode, and additional mapping complicates the transform process of the LFNST technology, thereby reducing encoding efficiency.

Furthermore, in the implementations of the present application, if the LFNST technology is used for the current block, the encoder no longer determines the value of predModeIntra by mapping the CCLM mode to the traditional intra prediction mode, but determines the LFNST transform kernel used for the current block based on the CCLM parameter, so as to set the corresponding LFNST index.

It can be understood that, in the implementations of the present application, the CCLM parameter includes the CCLM mode index, where the CCLM mode index indicates the CCLM mode used for the current block, and the CCLM mode indicates using CCLM to determine the calculation derivation manner of the intra prediction value of the current block.

It is to be noted that, in the implementations of the present application, when the encoder determines the LFNST index based on the CCLM parameter, the encoder can first determine the LFNST transform kernel candidate set, determine the LFNST transform kernel used for the current block from the LFNST transform kernel candidate set, and then set the LFNST index and signal it into the bitstream of the video. Herein, the transform matrix of LFNST is a matrix with multiple fixed coefficients obtained through training. The LFNST transform kernel candidate set contains two transform matrix (also called LFNST transform kernel) groups. After the LFNST transform kernel candidate set is determined, one LFNST transform kernel group needs to be selected from the LFNST transform kernel candidate set, that is, the transform matrix used for the current block in LFNST.

Furthermore, in the implementations of the present application, since the LFNST transform kernel candidate set contains two or more preset transform kernels, the transform kernel used for the current block can be selected in a rate distortion optimization manner. Specifically, for each transform kernel, the rate distortion cost (RDCost) can be calculated in the rate distortion optimization manner, and then the transform kernel with the smallest RDCost is selected as the transform kernel used for the current block.

That is, at the encoder side, one LFNST transform kernel group can be selected through RDCost, and the index (which can be represented by lfnst_idx) corresponding to the LFNST transform kernel is signalled into the bitstream of the video and transmitted to the decoder side. When the first LFNST transform kernel group (i.e., the first transform matrix group) in the LFNST transform kernel candidate set is selected, lfnst_idx is set to be 1. When the second LFNST transform kernel group (i.e., the second transform matrix group) in the LFNST transform kernel candidate set is selected, lfnst_idx is set to be 2.

It is to be noted that, in the implementations of the present application, for the value of the LFNST index (i.e., lfnst_idx), when the value of the LFNST index is equal to 0, LFNST will not be used; when the value of the LFNST index is greater than 0, LFNST will be used, and the index of the transform kernel is equal to the value of the LFNST index, or the index of the transform kernel is equal to the value of the LFNST index minus 1. Thereby, after the encoder determines the LFNST transform kernel used for the current block, it also needs to set the LFNST index and signal it into the bitstream of the video, so that, subsequently, at the decoder side, the LFNST index can be obtained by parsing the bitstream.

Figure 7:
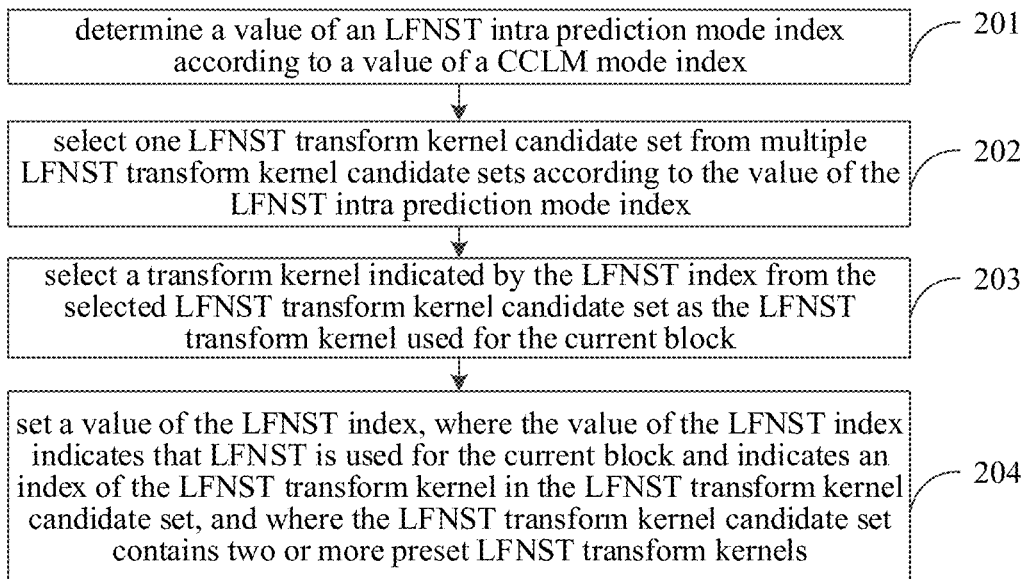
FIG. 7 is schematic diagram 2 of an implementation procedure of a transform method.

For example, in the implementations of the present application, FIG. 7 is schematic diagram 2 of an implementation procedure of a transform method. As illustrated in FIG. 7, when the CCLM parameter is CCLM mode index, the encoder determines the LFNST transform kernel used for the current block according to the CCLM parameter, sets the LFNST index, and signals the LFNST index into the bitstream of the video, which includes the following steps.

Step 201, a value of an LFNST intra prediction mode index is determined according to a value of a CCLM mode index.

Step 202, one LFNST transform kernel candidate set is selected from multiple LFNST transform kernel candidate sets according to the value of the LFNST intra prediction mode index.

Step 203, a transform kernel indicated by the LFNST index is selected from the selected LFNST transform kernel candidate set as the LFNST transform kernel used for the current block.

Step 204, a value of the LFNST index is set, where the value of the LFNST index indicates that LFNST is used for the current block and indicates an index of the LFNST transform kernel in the LFNST transform kernel candidate set, and where the LFNST transform kernel candidate set contains two or more preset LFNST transform kernels.

It is to be noted that, in the implementations of the present application, the CCLM mode index indicates the CCLM mode used for the current block, and the CCLM mode indicates the use of CCLM to determine the calculation derivation manner of the intra prediction value of the current block. That is, the encoder can further determine LFNST transform kernel according to the CCLM mode index.

Furthermore, in the implementations of the present application, after the CCLM mode index is determined, the encoder may convert the CCLM mode index into the value of the LFNST intra prediction mode index (which may be represented by predModeIntra). Then, according to the value of predModeIntra, the encoder selects one LFNST transform kernel candidate set from the multiple LFNST transform kernel candidate sets, to determine the transform kernel candidate set. The encoder further selects the transform kernel indicated by the LFNST index from the selected LFNST transform kernel candidate set, and sets it as the LFNST transform kernel used for the current block.

It can be understood that, in the implementations of the present application, for the value of the LFNST index, when the value of the LFNST index is equal to 0, LFNST will not be used; when the value of the LFNST index is greater than 0, LFNST will be used, and the index of the transform kernel is equal to the value of the LFNST index, or the index of the transform kernel is equal to the value of the LFNST index minus 1. Furthermore, after the encoder determines the LFNST transform kernel used for the current block, it also needs to set the LFNST index and signal it into the bitstream of the video, so that subsequently the LFNST index can be obtained by parsing the bitstream at the decoder side.

For example, in the implementations of the present application, the encoder determines the value of the LFNST intra prediction mode index according to the value of the CCLM mode index as follows. The encoder determines the value of the LFNST intra prediction mode index corresponding to the value of the CCLM mode index through a first look-up table, where the first look-up table at least contains one or more different CCLM mode indexes corresponding to each of two LFNST intra prediction mode indexes with different values.

That is, in the present application, when the CCLM parameter is CCLM mode index (modeId), during selecting the LFNST transform kernel used for the current block, the encoder can further obtain the value of the LFNST intra prediction mode index through looking up the table.

It should be noted that, in the implementations of the present application, the first look-up table (or look-up table1, LUT1) is used to reflect the correspondence between CCLM mode indexes and LFNST intra prediction mode indexes. That is, LUT1 at least contains one or more different CCLM mode indexes corresponding to each of two LFNST intra prediction mode indexes with different values.

That is, in the present application, different CCLM modes can correspond to different values of predModeIntra. Therefore, the encoder determines the CCLM mode index according to the CCLM mode, and then determines the value of predModeIntra according to the first look-up table. According to the value of predModeIntra, the encoder can select one LFNST transform kernel candidate set from the multiple LFNST transform kernel candidate sets, and then determine the LFNST transform kernel used for the current block.

It can be understood that, in the implementations of the present application, according to the value of the CCLM mode index (modeId), the value of predModeIntra can be determined. Then, according to the value of predModeIntra, the value of SetIdx can be directly determined according to Table 2, that is, the LFNST transform kernel candidate set selected for the current block is determined. Herein, the value of SetIdx indicates the transform kernel candidate set used in LFNST. Since the values of the CCLM mode index (modeId) may include 81, 82, and 83, the values of predModeIntra may also include 81, 82, and 83. Based on the above Table 1, the correspondence between predModeIntra and SetIdx is as follows.

TABLE 2

| predModeIntra | SetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |
| predModeIntra == 81 | 3 |
| 82 <= predModeIntra <= 83 | 1 |

It can be seen that, in the present application, after the above Table 1 is updated to the above Table 2, for the CCLM mode, the encoder no longer needs to select the transform kernel candidate set by mapping the CCLM mode to the traditional intra prediction mode. Instead, the encoder can directly obtain the corresponding LFNST index by querying the first look-up table based on the CCLM mode index corresponding to the CCLM mode, and finally determine the LFNST transform kernel candidate set.

In the implementations of the present application, furthermore, the decoder can directly determine the LFNST transform kernel candidate set according to the value of the CCLM mode index. In this case, the encoder no longer needs to use the value of predModeIntra, that is, no longer needs to determine the value of the LFNST intra prediction mode index according to the CCLM mode index.

Figure 8:
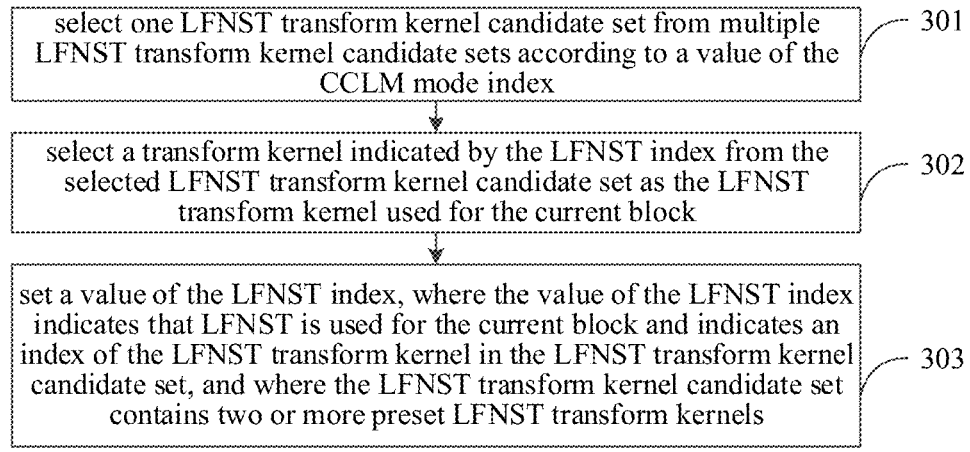
FIG. 8 is schematic diagram 3 of an implementation procedure of a transform method.

For example, in some implementations, FIG. 8 is schematic diagram 3 of an implementation procedure of a transform method. As illustrated in FIG. 8, when the CCLM parameter is CCLM mode index, the encoder determines the LFNST transform kernel used for the current block according to the CCLM parameter, sets the LFNST index, and signals the LFNST index into the bitstream of the video, which includes the following steps.

Step 301, one LFNST transform kernel candidate set is selected from multiple LFNST transform kernel candidate sets according to a value of the CCLM mode index.

Step 302, a transform kernel indicated by the LFNST index is selected from the selected LFNST transform kernel candidate set as the LFNST transform kernel used for the current block.

Step 303, a value of the LFNST index is set, where the value of the LFNST index indicates that LFNST is used for the current block and indicates an index of the LFNST transform kernel in the LFNST transform kernel candidate set, and where the LFNST transform kernel candidate set contains two or more preset LFNST transform kernels.

Furthermore, in the implementations of the present application, the encoder selects one LFNST transform kernel candidate set from the multiple LFNST transform kernel candidate sets according to the value of the CCLM mode index as follows. The encoder can determine a value of an LFNST transform kernel candidate set index corresponding to the value of the CCLM mode index through a second look-up table, and select an LFNST transform kernel candidate set indicated by the value of the LFNST transform kernel candidate set index as the selected LFNST transform kernel candidate set.

It is to be noted that, in the implementations of the present application, the second look-up table (or look-up table2, LUT2) at least contains one or more different CCLM mode indexes corresponding to each of two LFNST transform kernel candidate set indexes with different values.

It should be noted that, if the prediction mode used for the current block is the CCLM mode, the selected LFNST transform kernel candidate set may be directly determined according to the value of the CCLM mode index (modeId). As illustrated in Table 3, the value of SetIdx indicates the transform kernel candidate set used in LFNST. The values of the CCLM mode index (modeId) may include 81, 82, and 83, where each CCLM mode index corresponds to one LFNST transform kernel candidate set. Specifically, the correspondence between modeId and SetIdx is as follows.

TABLE 3

| modeId | SetIdx |
|---|---|
| modeId == 81 | 3 |
| 82 <= modeId <= 83 | 1 |

It can be seen that, in the present application, for the CCLM mode, the encoder no longer needs to select the transform kernel candidate set by mapping the CCLM mode to the traditional intra prediction mode. Instead, the encoder can directly obtain the corresponding LFNST index by querying the second look-up table based on the CCLM mode index corresponding to the CCLM mode, and finally determine the LFNST transform kernel candidate set. That is to say, the encoder can determine the value of the corresponding LFNST transform kernel candidate set index according to the value of the CCLM mode index, to select the LFNST transform kernel candidate set indicated by the value of the LFNST transform kernel candidate set index as the selected LFNST transform kernel candidate set. For example, it can be seen from Table 3, when the value of the CCLM mode index (modeId) is 81, it can be determined that the value of the LFNST transform kernel candidate set index (SetIdx) is 3, that is, the transform kernel candidate set indicated by 3 is used as the selected LFNST transform kernel candidate set. Alternatively, when modeId is 82 or 83, it can be determined that the value of SetIdx is 1, that is, the transform kernel candidate set indicated by 1 is used as the selected LFNST transform kernel candidate set, and the like.

In the implementations of the present application, furthermore, if the prediction mode of the current block is the CCLM mode, when determining the LFNST transform kernel candidate set, the encoder can also always select one transform set (such as set1 or set2 or set3) as one LFNST transform kernel candidate set selected from the multiple LFNST transform kernel candidate sets.

That is, in the implementations of the present application, when the encoder determines the LFNST transform kernel candidate set, for the current block on which intra prediction is performed using the CCLM mode, the encoder no longer performs mapping to the traditional intra prediction mode, instead, the encoder directly uses a preset fixed transform set as the corresponding LFNST transform kernel candidate set. For example, in the present application, for the current block for which the CCLM mode is used, the encoder may directly determine the LFNST transform kernel candidate set corresponding to the current block as set1.

In the implementations of the present application, furthermore, if the prediction mode of the current block is the CCLM mode, the encoder no longer performs mapping to the traditional intra prediction mode, instead the encoder selects the LFNST transform kernel candidate set directly according to the value of the CCLM mode index (modeId). Specifically, as illustrated in Table 4, each CCLM mode corresponds to one LFNST transform kernel candidate set, where the value of the LFNST index (which can be represented by SetIdx) can be determined according to the value of predModeIntra of the CCLM mode.

TABLE 4

| predModeIntra | SetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |
| predModeIntra == 81 | a |
| predModeIntra == 82 | b |
| predModeIntra == 83 | c |

It can be understood that, in the implementations of the present application, a, b, and c can each take a value from values {0, 1, 2, 3} of SetIdx corresponding to the four transform kernel candidate sets (set0, set1, set2, set3).

It should be noted that, in the implementations of the present application, if the prediction mode of the current block is the CCLM mode, the encoder can also select the LFNST transform kernel candidate set according to one or more combinations of information in the CCLM parameter.

Furthermore, in the implementations of the present application, if the prediction mode of the current block is the CCLM mode, the encoder can perform mapping to the traditional intra prediction mode according to the CCLM parameter to map it to a certain traditional intra prediction mode, and then fixedly select one transform set (such as set1 or set2 or set3) as one LFNST transform kernel candidate set selected from the multiple LFNST transform kernel candidate sets, or select the LFNST transform kernel candidate set based on the above Table 4.

It is to be noted that, in the implementations of the present application, the encoder can also determine the used transform matrix (i.e., transform kernel) according to one or more combinations of information in the CCLM parameter, and determining the transform matrix includes selecting the transform set and the transform matrix group category. The encoder can fixedly select a certain transform matrix group category in a certain transform set according to the CCLM parameter, which does not need to be selected at the encoder side, so there is no need to transmit lfnst_idx.

Furthermore, in the implementations of the present application, if the prediction mode parameter indicates that the non-CCLM mode is used for the current block, when selecting the LFNST transform kernel candidate set, the encoder may first determine the value of predModeIntra based on the intra prediction mode, and then select one LFNST transform kernel candidate set from the multiple LFNST transform kernel candidate sets according to the value of predModeIntra.

That is, in the present application, if the prediction mode of the current block is the non-CCLM mode, the value of predModeIntra may be determined according to the intra prediction mode. Then, according to the value of predModeIntra and in combination with the above Table 1, the LFNST transform kernel candidate set can be selected from the multiple LFNST transform kernel candidate sets. Then, the transform kernel indicated by the LFNST index may be selected from the selected LFNST transform kernel candidate set, and set as the LFNST transform kernel used for the current block. The value of the LFNST index is set to indicate that LFNST is used for the current block and indicate an index of the LFNST transform kernel in the LFNST transform kernel candidate set.

It can be understood that, in the implementations of the present application, for the value of the LFNST index, when the value of the LFNST index is equal to 0, LFNST will not be used; when the value of the LFNST index is greater than 0, LFNST will be used, and the index of the transform kernel is equal to the value of the LFNST index, or the index of the transform kernel is equal to the value of the LFNST index minus 1. Thereby, after the encoder determines the LFNST transform kernel used for the current block, it also needs to set the LFNST index and signal it into the bitstream of the video, so that, subsequently, the LFNST index can be obtained by parsing the bitstream at the decoder side.

Step 105, the residual value is transformed with the LFNST transform kernel.

In the implementations of the present application, after the encoder determines the LFNST transform kernel used for the current block according to the CCLM parameter, the encoder transforms the residual value with the LFNST transform kernel.

It should be noted that, in the implementations of the present application, after the encoder determines the LFNST transform kernel, it can obtain the transform matrix selected for the current block, and then transform the residual value.

It is to be noted that, in the implementations of the present application, each transform matrix group may also contain two sizes of base transform matrices T, such as 16×16 and 16×48. The transform matrices for TUs of four sizes are selected as follows. Specifically, for a 4×4 TU, an 8×16 transform matrix is used, where the 8×16 transform matrix comes from the first 8×16 of the 16×16 base transform matrix. For a 4×N or N×4 (N>4) TU, the 16×16 base transform matrix is used. For 8×8 TU, an 8×48 transform matrix is used, where the 8×48 transform matrix comes from the first 8×48 of the 16×48 base transform matrix. For a TU larger than 8×8, a 16×48 base transform matrix is used. It should be noted that, in the current H.266/VVC, only the transform matrix of LFNST at the decoder side (which can be represented by $T^T$) is stored, and the transform matrix used at the encoder side is the transpose of the transform matrix of LFNST (which can be represented by T).

It is to be noted that, in the implementations of the present application, LFNST applies non-separable transform based on direct matrix multiplication. In order to reduce the computational complexity and storage space as much as possible, a reduced non-separable transform technology is used in LFNST. The reduced non-separable transform technology aims to map an N-dimensional vector to an R-dimensional vector in a different space, where N/R (R<N) is the scaling factor. In this case, the transform matrix corresponding to the reduced non-separable transform technology is an R×N matrix, as illustrated below.

$$T_{R \times N} = \begin{bmatrix} t_{11} & t_{12} & t_{13} & \cdots & t_{1N} \\ t_{21} & t_{22} & t_{23} & \cdots & t_{2N} \\ \vdots & & \ddots & & \vdots \\ t_{R1} & t_{R2} & t_{R3} & \cdots & t_{RN} \end{bmatrix} \qquad (7)$$

Figure 9:
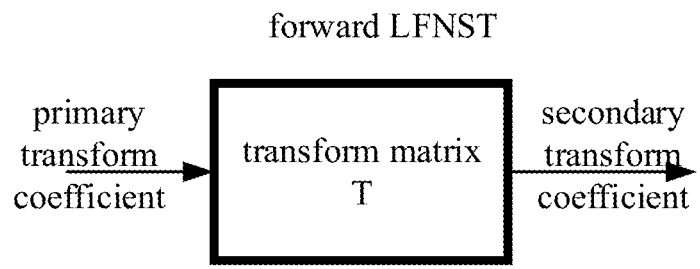
FIG. 9 is schematic structural diagram 1 of a calculation process of matrix multiplication of an LFNST technology.
Figure 10:
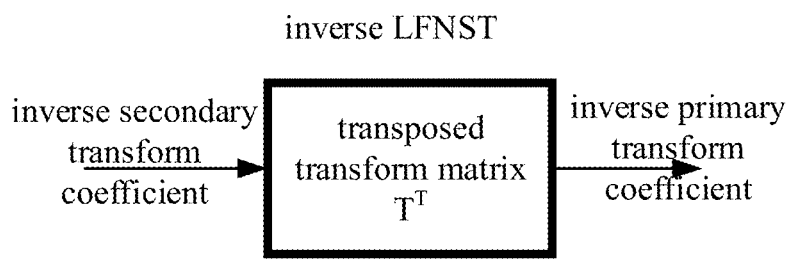
FIG. 10 is structural schematic diagram 2 of a calculation process of matrix multiplication of an LFNST technology.

Herein, the transform matrices used for the forward LFNST and the reverse LFNST are transposed to each other. FIG. 9 is schematic structural diagram 1 of a calculation process of matrix multiplication of an LFNST technology. FIG. 10 is structural schematic diagram 2 of a calculation process of matrix multiplication of an LFNST technology. As illustrated in FIG. 9 and FIG. 10, each of them illustrates a schematic structural diagram of a calculation process of matrix multiplication of an LFNST technology provided in implementations of the present application. FIG. 9 illustrates the calculation process of the forward LFNST. The secondary transform coefficient can be obtained based on calculation of the primary transform coefficient and the transform matrix T. FIG. 10 illustrates the calculation process of the inverse LFNST. The inverse primary transform coefficient can be obtained based on calculation of the inverse secondary transform coefficient and the transposed transform matrix $T^T$.

Furthermore, in the LFNST technology, it can be decided according to the size of the current block whether to adopt 4×4 non-separable transform or 8×8 non-separable transform. Herein, "4×4 non-separable transform" may be collectively referred to as "4×4 LFNST", and "8×8 non-separable transform" may be collectively referred to as "8×8 LFNST". Assuming that the current block has the width of nTbW and the height of nTbH, it can be concluded that, if min (nTbW, nTbH)<=4, then 4×4 LFNST can be used for the current block; otherwise, 8×8 LFNST can be used for the current block. It should be noted that, the return value of min (A, B) is the smaller of A and B.

In one implementation manner, for 4×4 LFNST, at the encoder side, 16 coefficients will be input, and after the forward LFNST, 16 or 8 coefficients will be output. At the decoder side, 16 or 8 coefficients will be input and 16 coefficients will be output. That is, the encoder and decoder are opposite in terms of the number of inputs and outputs.

Assuming that the size of a transform unit (TU) can be expressed as nTbW×nTbH, where the transform unit is a residual block obtained based on the residual value. That is, TU can be equal to 4×4, or can be equal to 4×N or N×4 (N>4). Each of them will be described in detail below.

Figure 11:
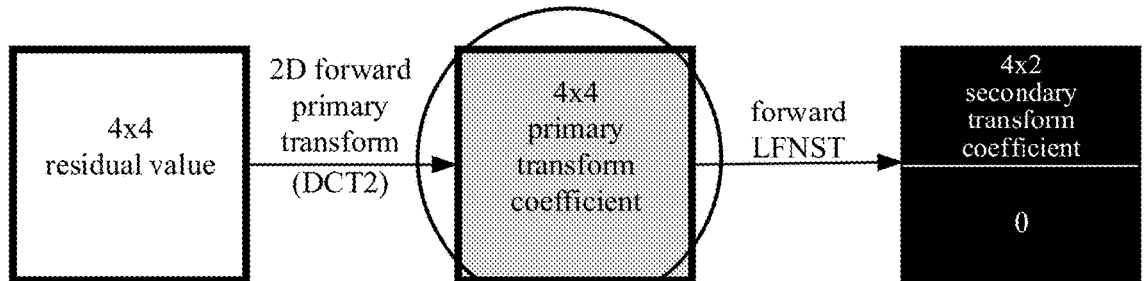
FIG. 11 is structural block diagram 1 of LFNST.
Figure 12:
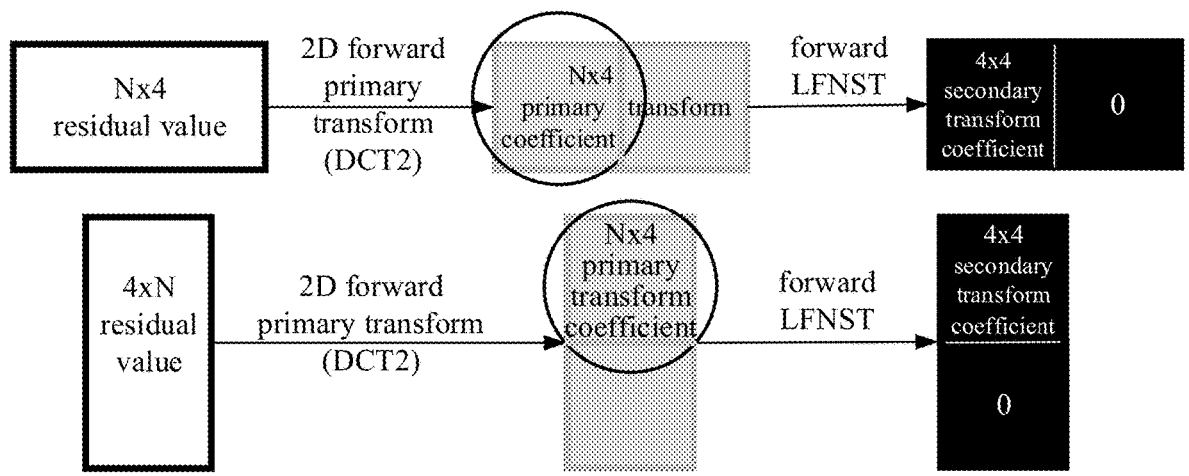
FIG. 12 is structural block diagram 2 of LFNST.
Figure 13:
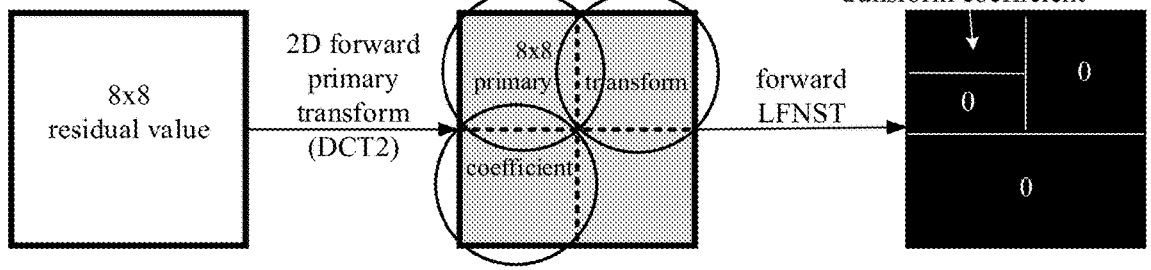
FIG. 13 is structural block diagram 3 of LFNST.
Figure 14:
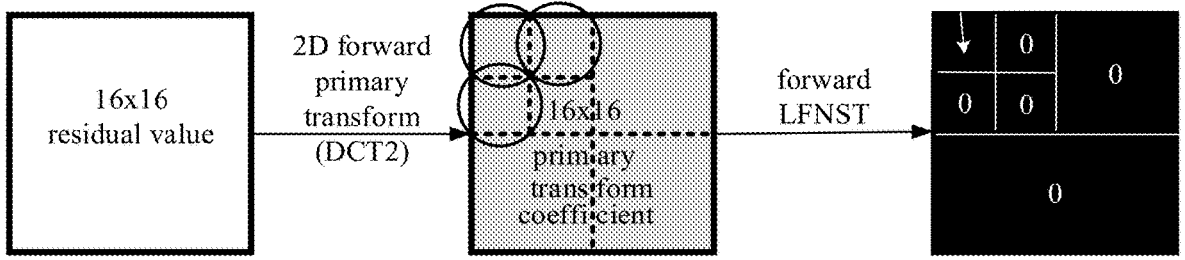
FIG. 14 is structural block diagram 4 of LFNST.

FIG. 11 is structural block diagram 1 of LFNST. FIG. 12 is structural block diagram 2 of LFNST. FIG. 13 is structural block diagram 3 of LFNST. FIG. 14 is structural block diagram 4 of LFNST. In the case that the TU is equal to 4×4, the forward LFNST process corresponding to the 4×4 transform unit is illustrated in FIG. 11. In FIG. 11, the white block is the residual value, the gray block is the primary transform coefficient, and the black block is the secondary transform coefficient. Herein, at the position of the example "0", the encoder sets the transform coefficient to be 0. For the 4×4 transform unit, in forward LFNST, the size of the used transform matrix is 8×16, all 4×4 primary transform coefficients in the current transform unit are used as input, and the output is 4×2 secondary transform coefficients.

In the case that the TU is equal to 4×N or N×4 (N>4), the forward LFNST process corresponding to the transform unit of 4×N or N×4 is illustrated in FIG. 12. In FIG. 12, the white block is the residual value, the gray block is the primary transform coefficient, and the black block is the secondary transform coefficient. Herein, for the 4×N or N×4 transform unit, in forward LFNST, the size of the used transform matrix is 16×16, the primary transform coefficients of the first 4×4 sub-block in the current transform unit (specifically, the top sub-block for the 4×N transform unit, and the far left sub-block for the N×4 transform unit) are used as input, and the output is 4×4 secondary transform coefficients. Herein, at the position of the example "0", the encoder still sets the transform coefficient to be 0.

In another implementation manner, for 8×8 LFNST, at the encoder side, 48 coefficients will be input, and after forward LFNST, 16 or 8 coefficients will be output. At the decoder side, 16 or 8 coefficients will be input and 48 coefficients will be output. That is, the encoder and decoder are opposite in terms of the number of inputs and outputs.

In the case that the TU is equal to 8×8, the forward LFNST process corresponding to the 8×8 transform unit is illustrated in FIG. 13. In FIG. 13, the white block is the residual value, the gray block is the primary transform coefficient, and the black block is the secondary transform coefficient. For the 8×8 transform unit, in forward LFNST, the size of the used transform matrix is 8×48, the primary transform coefficients of the first three 4×4 sub-blocks (i.e., the three sub-blocks at the top-left corner) in the current transform unit are taken as input, and the output is 4×2 secondary transform coefficients. Herein, at the position of the example "0", the encoder still sets the transform coefficients to be 0.

In the case that the TU is larger than 8×8, the forward LFNST process corresponding to the transform unit larger than 8×8 is illustrated in FIG. 14. In FIG. 14, the white block is the residual value, the gray block is the primary transform coefficient, and the black block is the secondary transform coefficient. For the transform unit larger than 8×8, in forward LFNST, the size of the used transform matrix is 48×16, the primary transform coefficients of the first three 4×4 sub-blocks (i.e., the three sub-blocks at the top-left corner) in the current transform unit are taken as input, and the output is 4×4 secondary transform coefficients. Herein, at the position of the example "0", the encoder still sets the transform coefficients to 0.

In this way, whether the size of the TU corresponding to the residual value is 4×4, or 4×N or N×4 (N>4), or 8×8, or even larger than 8×8, the transform of the residual value can be implemented according to FIG. 11 or FIG. 12 or FIG. 13 or FIG. 14.

It can be seen, in the implementations of the present application, for the current block on which intra prediction is performed using the CCLM mode, the decoder introduces relevant information of the CCLM parameter in the process of performing LFNST on the current block for which the CCLM mode is used, and selects the transform set (or transform kernel) according to the CCLM information. Therefore, when the current block is transformed, it is not necessary to map the CCLM mode to the traditional intra prediction mode. Thereby, the applicability of the LFNST technology to the current block for which the CCLM mode is used can be improved, so that selection of the transform set (or transform kernel) is more flexible.

The present application provides the transform method, which is applied to the encoder. The encoder determines the prediction mode parameter of the current block; determines the CCLM parameter when the prediction mode parameter indicates that CCLM prediction is used for the current block to determine the intra prediction value; determines the intra prediction value of the current block according to the CCLM parameter, and calculates the residual value between the current block and the intra prediction value; determines the LFNST transform kernel used for the current block according to the CCLM parameter, sets the LFNST index, and signals the LFNST index into the bitstream of the video, when LFNST is used for the current block; and transforms the residual value with the LFNST transform kernel. It can be seen that, in the implementations of the present application, when performing transform on the current block on which intra prediction is performed using the CCLM mode, a codec does not need to map the CCLM mode to the traditional intra prediction mode. Instead, the codec can determine the LFNST transform kernel used for the current block directly according to the CCLM parameter corresponding to the current block, so that the LFNST transform kernel can be used to perform LFNST. Understandably, since the CCLM parameter is introduced in LFNST, selection of the LFNST transform kernel is more flexible, which can improve the applicability of the LFNST technology to the CCLM mode, simplify the transform process of the LFNST technology, and effectively improve the encoding efficiency.

Figure 15:
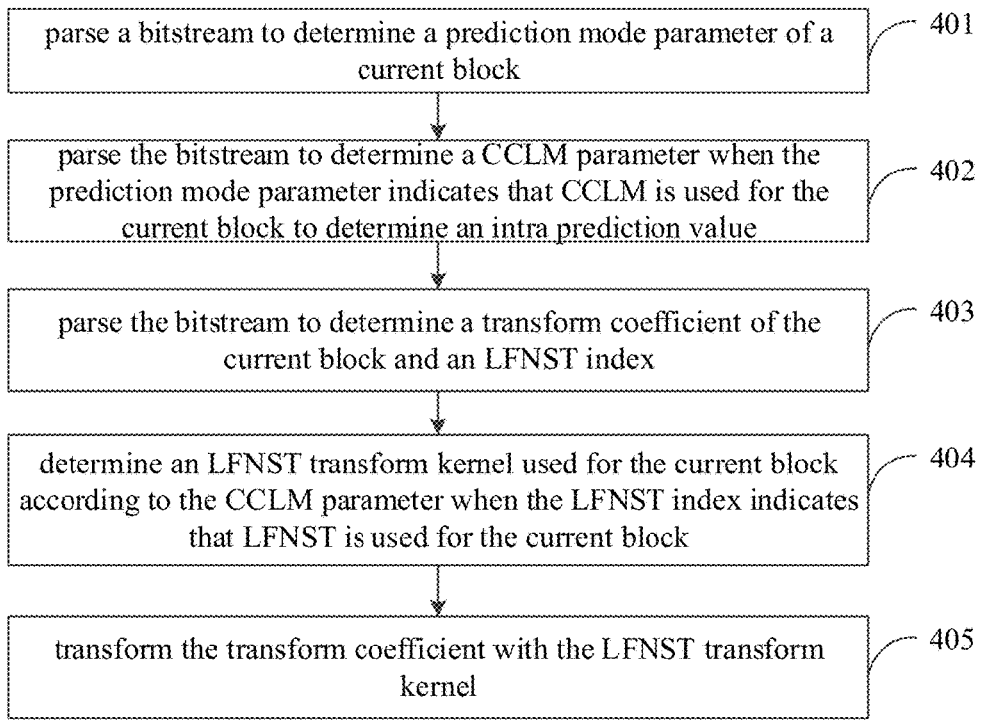
FIG. 15 is a schematic diagram 4 of an implementation procedure of a transform method.

Another implementation of the present application provides a transform method, which is applied to a decoder. FIG. 15 is a schematic diagram 4 of an implementation procedure of a transform method. As illustrated in FIG. 15, the transform method performed by the decoder may include the following steps.

Step 401, a bitstream is parsed to determine a prediction mode parameter of a current block.

In the implementations of the present application, after the bitstream of a video is received, the decoder can parse the bitstream to determine the prediction mode parameter corresponding to the current block.

It should be noted that, in the implementations of the present application, the prediction mode parameter indicates the coding mode of the current block and parameters related to this mode. The prediction mode generally includes the traditional intra prediction mode and the non-traditional intra prediction mode. The traditional intra prediction mode may include DC mode, PLANAR mode, angle mode, and the like. The non-traditional intra prediction mode may include MIP mode, CCLM mode, IBC mode, PLT mode, and the like.

It can be understood that, in the implementations of the present application, at the encoder side, prediction is performed for the current block. In this process, the prediction mode of the current block can be determined, and the corresponding prediction mode parameter can be signalled into the bitstream, which is transmitted from an encoder to the decoder.

Accordingly, in the present application, at the decoder side, by parsing the bitstream, the intra prediction mode of the luma component or the chroma component of the current block or the coding block where the current block locates can be obtained. In this case, a value of an intra prediction mode indicator (which can be represented by predModeIntra) can be determined. The calculation formula refers to the above formula (5).

In formula (5), the colour component indicator (which can be denoted by cIdx) is used to indicate the luma component or the chroma component of the current block. Herein, if the current block predicts the luma component, cIdx is equal to 0; if the current block predicts the chroma component, then cIdx is equal to 1. In addition, (xTbY, yTbY) is the coordinate of the sample at the top-left corner of the current block, IntraPredModeY[xTbY][yTbY] is the intra prediction mode of the luma component, and IntraPredModeC[xTbY][yTbY] is the intra prediction mode of the chroma component.

That is, in the implementations of the present application, the decoder may determine, through the prediction mode parameter, which one (the traditional intra prediction mode or the non-traditional intra prediction mode) is the decoding mode of the current block.

Step 402, the bitstream is parsed to determine a CCLM parameter when the prediction mode parameter indicates that CCLM is used for the current block to determine an intra prediction value.

In the implementations of the present application, after the decoder determines the prediction mode parameter of the current block, if the prediction mode parameter indicates that the CCLM mode is used for the current block to determine the intra prediction value, the decoder can proceed to determine the CCLM parameter.

It is to be noted that, in the implementations of the present application, the CCLM parameter includes a CCLM mode index, where the CCLM mode index indicates a CCLM mode used for the current block, and the CCLM mode indicates the use of CCLM to determine a calculation derivation manner of the intra prediction value of the current block.

Furthermore, in the implementations of the present application, the decoder can determine the CCLM parameter by parsing the bitstream. Specifically, the decoder determines the CCLM mode index (which can be represented by modeId) by parsing the bitstream. The CCLM mode index can be used to indicate the CCLM mode used for the current block, and the CCLM mode can be used to indicate the use of CCLM to determine the calculation derivation manner of the intra prediction value of the current block.

It can be understood that, in the implementations of the present application, specifically, the CCLM mode may include various different prediction modes. Therefore, it is necessary to use different indexes to mark and distinguish different prediction modes in the CCLM mode. That is, different CCLM modes correspond to different CCLM mode indexes.

Furthermore, in the implementations of the present application, when the decoder determines the calculation derivation manner of the intra prediction value of the current block by using the CCLM parameter, it can determine the specific CCLM mode, and thus can obtain the corresponding CCLM mode index.

It is to be noted that, in the implementations of the present application, the CCLM mode index may specifically include 81, 82, and 83.

Step 403, the bitstream is parsed to determine a transform coefficient of the current block and an LFNST index.

In the implementations of the present application, after the CCLM parameter corresponding to the current block is determined, the decoder can proceed to parse the bitstream, so that the transform coefficient of the current block and the LFNST index can be further determined.

It is to be noted that, in the implementations of the present application, the value of the LFNST index may be used to indicate whether LFNST is used for the current block, and to indicate an index of the LFNST transform kernel in the LFNST transform kernel candidate set. Specifically, after the LFNST index is obtained through parsing, when the value of the LFNST index is equal to 0, it indicates that LFNST is not used for the current block; when the value of the LFNST index is greater than 0, it indicates that LFNST is used for the current block, and the index of the transform kernel is equal to the value of the LFNST index, or the index of the transform kernel is equal to the value of the LFNST index minus 1.

Furthermore, in the implementations of the present application, at the decoder side, the input data of LFNST may include: luma position (xTbY, yTbY) of the current transform unit, width nTbW of the current block, height nTbH of the current block, whether the current block is a luma component or a chroma component cIdx, and coefficient d[x][y] of the current transform unit after inverse quantization (or scaling), where x=0, 1, . . . , nTbW−1, y=0, 1, . . . , nTbH−1. Accordingly, the output data of LFNST may include: primary transform coefficient d'[x][y] obtained after the secondary transform coefficient is subjected to LFNST, where x=0, 1, . . . , nLfnstSize−1, y=0, 1, . . . , nLfnstSize−1.

Figure 16:
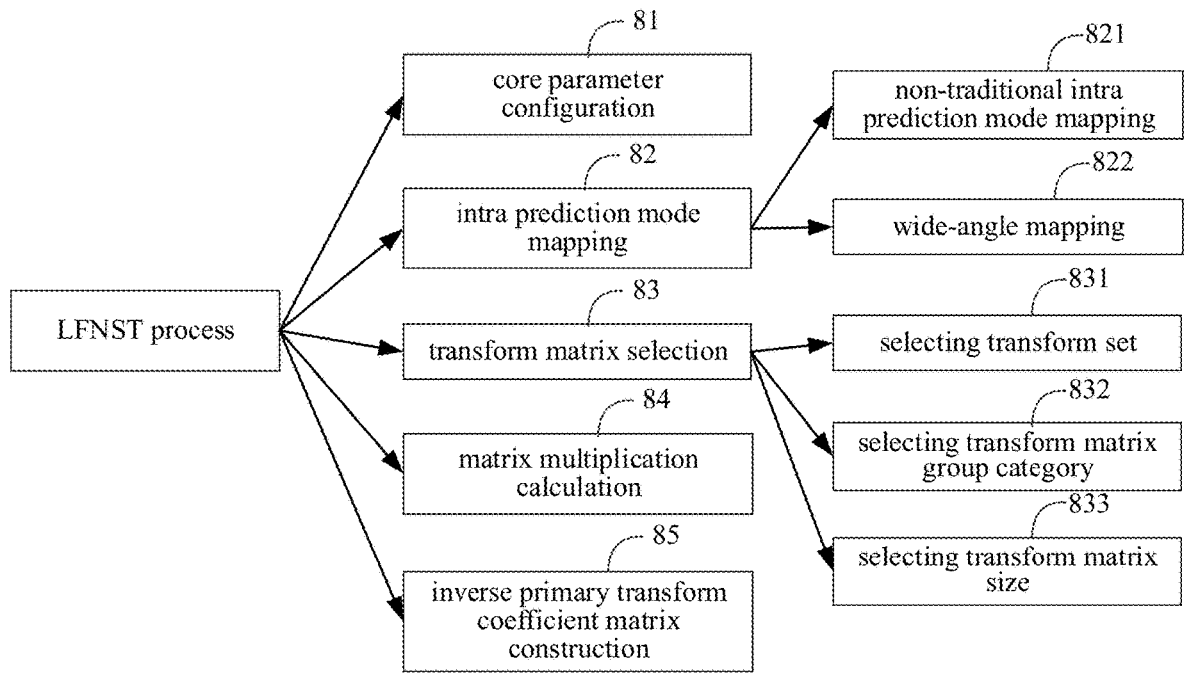
FIG. 16 is a schematic diagram of a processing procedure of LFNST.

It can be understood that, in the implementations of the present application, FIG. 16 is a schematic diagram of a processing procedure of LFNST. As illustrated in FIG. 16, the specific process of LFNST can include five steps of: core parameter configuration 81, intra prediction mode mapping 82, transform matrix selection 83, matrix multiplication calculation 84, and inverse primary transform coefficient matrix construction 85. For intra prediction mode mapping 82, this step is performed to determine a value of predModeIntra, which may mainly include: non-traditional intra prediction mode mapping 821 and wide-angle mapping 822. For transform matrix selection 83, this step is performed to select a transform set and a transform matrix, which may mainly include: selecting a transform set 831, selecting a transform matrix group category 832, and selecting a transform matrix size 833.

For core parameter configuration 81, it is first necessary to configure the length (which can be represented by nonZeroSize) of the input secondary transform coefficient vector and the length (which can be represented by nLfnstOutSzie) of the output primary transform coefficient vector for LFNST calculation. The values of nonZeroSize and nLfnstOutSzie are illustrated in Table 5.

TABLE 5

| size of the transform unit | nonZeroSize | nLfnstOutSzie |
|---|---|---|
| 4 × 4 | 8 | 16 |
| 4 × N or N × 4 (N > 4) | 16 | 16 |
| 8 × 8 | 8 | 48 |
| >8 × 8 | 16 | 48 |

In the current H.266/VVC, the parameter configuration such as nonZeroSize and nLfnstOutSzie are calculated through the following formula. The formula is as follows.

$$nLfnstOutSize=(nTbW>=8\&\&nTbH>=8)?48:16 \quad (8)$$

$$nonZeroSize=(nTbW==4\&\&nTbH==4)|| \\ (nTbW==8\&\&nTbH==8)?8:16 \quad (9)$$

Furthermore, the decoder needs to configure parameter nLfnstSize, indicating that there is a primary transform coefficient only in the range of the first nLfnstSize×nLfnstSize in the current block. The value of nLfnstSize is as follows.

$$Log\ 2LfnstSize=(nTbW>=8\&\&nTbH>=8)?3:2 \quad (10)$$

$$nLfnstSize=1<<Log\ 2LfnstSize \quad (11)$$

In this case, by parsing the bitstream, the intra prediction mode of the luma component or chroma component of the current block or the coding block where the current block locates can also be obtained, and the value of the intra prediction mode indicator (which can be represented by predModeIntra) can be determined. The calculation formula refers to the above formula (5).

Furthermore, the vector u[i] of the secondary transform coefficient can be obtained, where i=0, 1, . . . , nonZeroSize−1. When it is determined that LFNST is used for the current transform unit, coefficient d[x][y] after inverse quantization is the secondary transform coefficient. The first nonZeroSize values are obtained in in the diagonal scan order as the vector u[i] of the secondary transform coefficient, where i=0, 1, . . . , nonZeroSize−1. In the following formula, xC and yC represent the coordinate of the i-th coefficient relative to the point at the top-left corner at the current block and are determined by the diagonal order. xC and yC are illustrated below.

$$xC=DiagScanOrder[2][2][i][0] \quad (12)$$

$$yC=DiagScanOrder[2][2][i][1] \quad (13)$$

$$u[i]=d[xC][yC] \quad (14)$$

Furthermore, for the intra prediction mode mapping 82, the intra prediction mode includes the traditional intra prediction mode and the non-traditional intra prediction mode. For the non-traditional intra prediction mode, information indicated by the value of predModeIntra is as follows.

If the value of predModeIntra is INTRA_LT_CCLM, INTRA_L_CCLM, or INTRA_T_CCLM (respectively 81, 82, 83 in VVC), it indicates that the prediction mode of the current block is the CCLM mode.

If intra_mip_flag[xTbY][yTbY] is equal to 1 and cIdx is equal to 0, it indicates that the prediction mode of the current block is the MIP mode. In this case, the value of predModeIntra indicates the used MIP mode index modeId.

If it is not the above two cases, the value of predModeIntra can be in [0, 66], indicating that the prediction mode of the current block is the traditional intra prediction mode.

Currently, the LFNST transform kernel candidate set index is determined according to the number of the traditional intra prediction mode by parsing the bitstream. In this case, if the prediction mode of the current block is the CCLM mode or the MIP mode, the value of predModeIntra can be set as follows.

(1) When the value of predModeIntra indicates INTRA_LT_CCLM, INTRA_L_CCLM or INTRA_T_CCLM (respectively 81, 82, 83 in VVC),
  if the mode of the luma block at the center of the luma position corresponding to the current block (such as the chroma block) is the MIP mode, that is, intra_mip_flag [xTbY+nTbW/2][yTbY+nTbH/2] is 1, then a value of predMode Intra is set to the index (i.e., 0) indicating the PLANAR mode;
  otherwise, if the mode of the luma block at the center of the luma position corresponding to the current block (such as the chroma block) is the intra block copy (IBC) mode or the PLT mode, the value of predModeIntra is set to the index (i.e., 1) indicating the direct current (DC) mode;
  otherwise, the value of predModeIntra is set to the value IntraPredModeY[xTbY+nTbW/2][yTbY+nTbH/2] of the mode index of the luma block at the center of the luma position corresponding to the current block (such as the chroma block).

(2) When itra_mip_flag[xTbY][yTbY] is equal to 1 and cIdx is equal to 0, that is, the prediction mode of the current block is the MIP mode, the value of predModeIntra can be directly set as the index (i.e., 0) indicating the PLANAR mode.

For the traditional intra prediction mode (such as wide-angle mapping), in the process of parsing the bitstream, wide-angle mapping can also be performed according to the size of the current block, and the traditional intra prediction mode [0, 66] can be extended to [−14, 80]. The specific mapping process is as follows.

First, calculate the width-height ratio factor (denoted by whRatio), as illustrated in the above formula (6).

For a non-square current block (that is, nTbW is not equal to nTbH), the value of predModeIntra can be modified as follows. If nTbW is greater than nTbH, and predModeIntra is greater than or equal to 2 and predModeIntra is less than ((whRatio>1?(8+2×whRatio):8), then predModeIntra= (predModeIntra+65). Otherwise, if nTbW is less than nTbH, and predModeIntra is less than or equal to 66 and predModeIntra is greater than ((whRatio>1?(60−2×whRatio):60), then predModeIntra=(predModeIntra−67).

In the current H.266/VVC, the value of the LFNST index (denoted by SetIdx) can be determined according to the value of predModeIntra and Table 1. The specific value is illustrated in Table 1. Herein, the value of the LFNST index is set to indicate that LFNST is used for the current block and indicate an index of the LFNST transform kernel in the LFNST transform kernel candidate set. Generally, the LFNST transform set includes four transform kernel candidate sets (set0, set1, set2, set3), with respective SetIdx values of 0, 1, 2, 3.

It should be understood that, in the implementations of the present application, since the LFNST transform matrix is related to the directional characteristics of the prediction mode, for the non-traditional intra prediction mode such as the CCLM mode, since selection of the transform set cannot be performed, it needs to be mapped to the traditional intra prediction mode first. Specifically, during mapping, the value of predModeIntra is set mainly based on the intra prediction mode of the luma block at the center of the luma position corresponding to the chroma transform unit. That is, currently, if the intra prediction mode of the luma block at the center of the luma position corresponding to the chroma transform unit is the MIP mode, the CCLM mode can be mapped to the PLANAR. If the intra prediction mode of the luma block at the center of the luma position corresponding to the chroma transform unit is the IBC mode or the PLT mode, the CCLM mode may be mapped to DC. If the intra prediction mode of the luma block at the center of the luma position corresponding to the chroma transform unit is the traditional intra prediction mode, proceed to perform wide-angle mapping according to the size of the current chroma transform unit. Then, the selection of the transform kernel candidate set is performed according to the mapped angle.

That is, for the current H.266/VVC, it is necessary to map the CCLM mode to the traditional intra prediction mode before selection of the transform kernel candidate set. However, the above mapping manner has poor accuracy and may introduce new mapping. It can be seen that, the current LFNST technology has poor applicability to the CCLM mode, and additional mapping complicates the transform process of the LFNST technology, thereby reducing decoding efficiency.

Furthermore, in the implementations of the present application, if the LFNST technology is used for the current block, the decoder no longer determines the value of predModeIntra by mapping the CCLM mode to the traditional intra prediction mode, but determines the LFNST transform kernel used for the current block based on the CCLM parameter, so as to set the corresponding LFNST index.

It should be noted that, in the implementations of the present application, after the decoder determines the LFNST index, it can determine the LFNST transform kernel candidate set according to the CCLM parameter, and then determine the LFNST transform kernel used for the current block from the LFNST transform kernel candidate set.

Step 404, an LFNST transform kernel used for the current block is determined according to the CCLM parameter when the LFNST index indicates that LFNST is used for the current block.

In the implementations of the present application, after the decoder determines the transform coefficient of the current block and the LFNST index by parsing the bitstream, if it is determined based on the LFNST index that LFNST is used for the current block, the decoder may further determine the LFNST transform kernel used for the current block according to the CCLM parameter.

It can be understood that, in the implementations of the present application, the CCLM parameter can include a CCLM mode index, where the CCLM mode index indicates a CCLM mode used for the current block, and the CCLM mode indicates the use of CCLM to determine a calculation derivation manner of the intra prediction value of the current block.

It is to be noted that, in the implementations of the present application, since the LFNST transform kernel candidate set contains two or more preset transform kernels, after the LFNST index is obtained by parsing the bitstream, the transform kernel indicated by the LFNST index may be selected from the LFNST transform kernel candidate set according to the value of the obtained LFNST index. For example, when the value of the LFNST index is 1, the first LFNST transform kernel group (i.e., the first transform matrix group) in the LFNST transform kernel candidate set will be selected. Alternatively, when the value of the LFNST index is 2, the second LFNST transform kernel group (i.e., the second transform matrix group) in the LFNST transform kernel candidate set will be selected.

Furthermore, in the implementations of the present application, for the value of the LFNST index (i.e., lfnst_idx), when the value of the LFNST index is equal to 0, LFNST will not be used; when the value of the LFNST index is greater than 0, LFNST will be used, and the index of the transform kernel is equal to the value of the LFNST index, or the index of the transform kernel is equal to the value of the LFNST index minus 1. Thereby, the decoder can further determine the LFNST transform kernel used for the current block according to the LFNST index.

Figure 17:
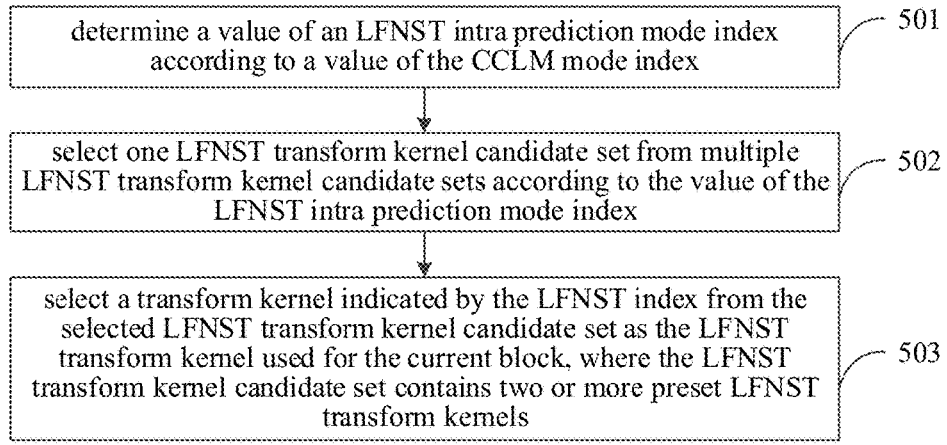
FIG. 17 is schematic diagram 5 of an implementation procedure of a transform method.

For example, in the implementations of the present application, FIG. 17 is schematic diagram 5 of an implementation procedure of a transform method. As illustrated in FIG. 17, when the decoder determines the LFNST transform kernel used for the current block according to the CCLM parameter, if the CCLM parameter is the CCLM mode index, when the LFNST index indicates that LFNST is used for the current block, the decoder determines the LFNST transform kernel used for the current block according to the CCLM parameter, which may include the following steps.

Step 501, a value of an LFNST intra prediction mode index is determined according to a value of the CCLM mode index.

Step 502, one LFNST transform kernel candidate set is selected from multiple LFNST transform kernel candidate sets according to the value of the LFNST intra prediction mode index.

Step 503, a transform kernel indicated by the LFNST index is selected from the selected LFNST transform kernel candidate set as the LFNST transform kernel used for the current block, where the LFNST transform kernel candidate set contains two or more preset LFNST transform kernels.

It is to be noted that, in the implementations of the present application, the CCLM mode index indicates the CCLM mode used for the current block, and the CCLM mode indicates the use of CCLM to determine the calculation derivation manner of the intra prediction value of the current block. That is, the decoder can further determine LFNST transform kernel according to the CCLM mode index.

Furthermore, in the implementations of the present application, after the CCLM mode index is determined, the decoder may convert the CCLM mode index into the value of the LFNST intra prediction mode index (which may be represented by predModeIntra). Then, according to the value of predModeIntra, the decoder selects one LFNST transform kernel candidate set from the multiple LFNST transform kernel candidate sets, to determine the transform kernel candidate set. The decoder further selects the transform kernel indicated by the LFNST index from the selected LFNST transform kernel candidate set, and sets it as the LFNST transform kernel used for the current block.

It should be noted that, in the implementations of the present application, after the CCLM mode index is determined, the decoder may convert the CCLM mode index into the value of the LFNST intra prediction mode index (which may be represented by predModeIntra). Then, according to the value of predModeIntra, the decoder selects one LFNST transform kernel candidate set from the multiple LFNST transform kernel candidate sets, to determine the transform kernel candidate set. The decoder further selects the transform kernel indicated by the LFNST index from the selected LFNST transform kernel candidate set.

For example, in the implementations of the present application, the decoder determines the value of the LFNST intra prediction mode index according to the value of the CCLM mode index as follows. The decoder determines the value of the LFNST intra prediction mode index corresponding to the value of the CCLM mode index through a first look-up table, where the first look-up table at least contains one or more different CCLM mode indexes corresponding to each of two LFNST intra prediction mode indexes with different values.

That is, in the present application, when the CCLM parameter is CCLM mode index (modeId), during selecting the LFNST transform kernel used for the current block, the decoder can further obtain the value of the LFNST intra prediction mode index through looking up the table.

It should be noted that, in the implementations of the present application, the first look-up table (or look-up table1, LUT1) is used to reflect the correspondence between CCLM mode indexes and LFNST intra prediction mode indexes. That is, LUT1 at least contains one or more different CCLM mode indexes corresponding to each of two LFNST intra prediction mode indexes with different values.

That is, in the present application, different CCLM modes can correspond to different values of predModeIntra. Therefore, the decoder determines the CCLM mode index according to the CCLM mode, and then determines the value of predModeIntra according to the first look-up table. According to the value of predModeIntra, the decoder can select one LFNST transform kernel candidate set from the multiple LFNST transform kernel candidate sets, and then determine the LFNST transform kernel used for the current block.

It can be understood that, in the implementations of the present application, according to the value of the CCLM mode index (modeId), the value of predModeIntra can be determined. Then, according to the value of predModeIntra, the value of SetIdx can be directly determined according to Table 2, that is, the LFNST transform kernel candidate set selected for the current block is determined. Herein, the value of SetIdx indicates the transform kernel candidate set used in LFNST. Since the values of the CCLM mode index (modeId) may include 81, 82, and 83, the values of predModeIntra may also include 81, 82, and 83. Based on the above Table 1, the correspondence between predModeIntra and SetIdx can refer to the above Table 2.

It can be seen that, in the present application, after the above Table 1 is updated to the above Table 2, for the CCLM mode, the decoder no longer needs to select the transform kernel candidate set by mapping the CCLM mode to the traditional intra prediction mode. Instead, the decoder can directly obtain the corresponding LFNST index by querying the first look-up table based on the CCLM mode index corresponding to the CCLM mode, and finally determine the LFNST transform kernel candidate set.

In the implementations of the present application, furthermore, the decoder can directly determine the LFNST transform kernel candidate set according to the value of the CCLM mode index. In this case, the decoder no longer needs to use the value of predModeIntra, that is, no longer needs to determine the value of the LFNST intra prediction mode index according to the CCLM mode index.

Figure 18:
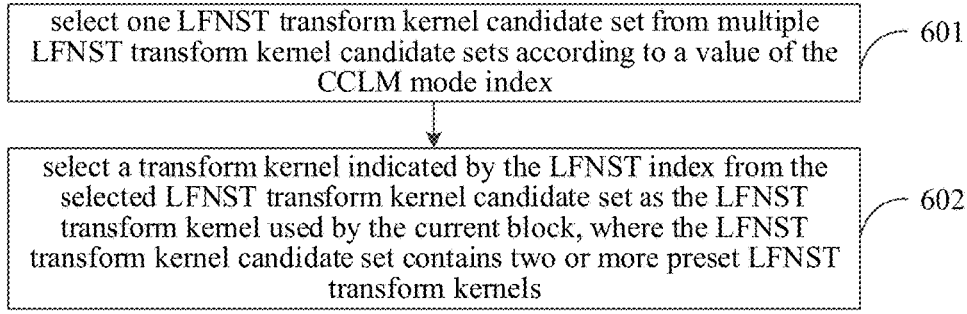
FIG. 18 is schematic diagram 6 of an implementation procedure of a transform method.

For example, in the implementations of the present application, FIG. 18 is schematic diagram 6 of an implementation procedure of a transform method. As illustrated in FIG. 18, when the CCLM parameter is the CCLM mode index, when the LFNST index indicates that LFNST is used for the current block, the decoder determines the LFNST transform kernel used for the current block according to the CCLM parameter, which may include the following steps.

Step 601, one LFNST transform kernel candidate set is selected from multiple LFNST transform kernel candidate sets according to a value of the CCLM mode index.

Step 602, a transform kernel indicated by the LFNST index is selected from the selected LFNST transform kernel candidate set as the LFNST transform kernel used for the current block, where the LFNST transform kernel candidate set contains two or more preset LFNST transform kernels.

Furthermore, in the implementations of the present application, the decoder selects one LFNST transform kernel candidate set from the multiple LFNST transform kernel candidate sets according to the value of the CCLM mode index as follows. The decoder can determine a value of an LFNST transform kernel candidate set index corresponding to the value of the CCLM mode index through a second look-up table, and select an LFNST transform kernel candidate set indicated by the value of the LFNST transform kernel candidate set index as the selected LFNST transform kernel candidate set.

It is to be noted that, in the implementations of the present application, the second look-up table (or look-up table2, LUT2) at least contains one or more different CCLM mode indexes corresponding to each of two LFNST transform kernel candidate set indexes with different values.

It should be noted that, if the prediction mode used for the current block is the CCLM mode, the selected LFNST transform kernel candidate set may be directly determined according to the value of the CCLM mode index (modeId). As illustrated in Table 3, the value of SetIdx indicates the transform kernel candidate set used in LFNST. The values of the CCLM mode index (modeId) may include 81, 82, and 83, where each CCLM mode index corresponds to one LFNST transform kernel candidate set. Specifically, the correspondence between modeId and SetIdx is illustrated in the above Table 3.

It can be seen that, in the present application, for the CCLM mode, the decoder no longer needs to select the transform kernel candidate set by mapping the CCLM mode to the traditional intra prediction mode. Instead, the decoder can directly obtain the corresponding LFNST index by querying the second look-up table based on the CCLM mode index corresponding to the CCLM mode, and finally determine the LFNST transform kernel candidate set. That is to say, the decoder can determine the value of the corresponding LFNST transform kernel candidate set index according to the value of the CCLM mode index, to select the LFNST transform kernel candidate set indicated by the value of the LFNST transform kernel candidate set index as the selected LFNST transform kernel candidate set. For example, it can be seen from Table 3, when the value of the CCLM mode index (modeId) is 81, it can be determined that the value of the LFNST transform kernel candidate set index (SetIdx) is 3, that is, the transform kernel candidate set indicated by 3 is used as the selected LFNST transform kernel candidate set. Alternatively, when modeId is 82 or 83, it can be determined that the value of SetIdx is 1, that is, the transform kernel candidate set indicated by 1 is used as the selected LFNST transform kernel candidate set, and the like.

In the implementations of the present application, furthermore, if the prediction mode of the current block is the CCLM mode, when determining the LFNST transform kernel candidate set, the decoder can also fixedly select one transform set (such as set1 or set2 or set3) as one LFNST transform kernel candidate set selected from the multiple LFNST transform kernel candidate sets.

That is, in the implementations of the present application, when the decoder determines the LFNST transform kernel candidate set, for the current block on which intra prediction is performed using the CCLM mode, the decoder no longer performs mapping to the traditional intra prediction mode, instead, the decoder directly uses a preset fixed transform set as the corresponding LFNST transform kernel candidate set. For example, in the present application, for the current block for which the CCLM mode is used, the decoder may directly determine the LFNST transform kernel candidate set corresponding to the current block as set1.

In the implementations of the present application, furthermore, if the prediction mode of the current block is the CCLM mode, the encoder no longer performs mapping to the traditional intra prediction mode, instead the encoder selects the LFNST transform kernel candidate set directly according to the value of the CCLM mode index (modeId). Specifically, as illustrated in Table 4, each CCLM mode corresponds to one LFNST transform kernel candidate set, where the value of the LFNST index (which can be represented by SetIdx) can be determined according to the value of predModeIntra of the CCLM mode.

It can be understood that, in the implementations of the present application, a, b, and c in Table 4 each can arbitrarily take a value from values {0, 1, 2, 3} of SetIdx corresponding to the four transform kernel candidate sets (set0, set1, set2, set3).

It should be noted that, in the implementations of the present application, if the prediction mode of the current block is the CCLM mode, the decoder can also select the LFNST transform kernel candidate set according to one or more combinations of information in the CCLM parameter.

Furthermore, in the implementations of the present application, if the prediction mode of the current block is the CCLM mode, the decoder can perform mapping to the traditional intra prediction mode according to the CCLM parameter to map it to a certain traditional intra prediction mode, and then select fixedly one transform set (such as set1 or set2 or set3) as one LFNST transform kernel candidate set selected from the multiple LFNST transform kernel candidate sets, or select the LFNST transform kernel candidate set based on the above Table 4.

It is to be noted that, in the implementations of the present application, the decoder can also determine the used transform matrix (i.e., transform kernel) according to one or more combinations of information in the CCLM parameter, and determining the transform matrix includes selecting the transform set and the transform matrix group category. The decoder can fixedly select a certain transform matrix group category in a certain transform set according to the CCLM parameter, which does not need to be selected at the encoder side, so there is no need to transmit lfnst_idx. Thus, at the decoder side, there is no need to parse the bitstream for lfnst_idx.

Furthermore, in the implementations of the present application, if the prediction mode parameter indicates that the non-CCLM mode is used for the current block, when selecting the LFNST transform kernel candidate set, the decoder may first determine the value of predModeIntra based on the intra prediction mode, and then select one LFNST transform kernel candidate set from the multiple LFNST transform kernel candidate sets according to the value of predModeIntra.

That is, if the prediction mode of the current block is the non-CCLM mode, the value of predModeIntra may be determined according to the intra prediction mode. Then, according to the value of predModeIntra and in combination with the above Table 1, the LFNST transform kernel candidate set can be selected from the multiple LFNST transform kernel candidate sets. Then, the transform kernel indicated by the LFNST index may be selected from the selected LFNST transform kernel candidate set, and set as the LFNST transform kernel used for the current block.

It can be understood that, in the implementations of the present application, for the value of the LFNST index, when the value of the LFNST index is equal to 0, LFNST will not be used; when the value of the LFNST index is greater than 0, LFNST will be used, and the index of the transform kernel is equal to the value of the LFNST index, or the index of the transform kernel is equal to the value of the LFNST index minus 1. Thereby, after the decoder determines the LFNST transform kernel used for the current block, it also needs to set the LFNST index and signal it into the bitstream of the video, so that, subsequently, the LFNST index can be obtained by parsing the bitstream at the decoder side.

Step 405, the transform coefficient is transformed with the LFNST transform kernel.

In the implementations of the present application, after the decoder determines the LFNST transform kernel used for the current block according to the CCLM parameter, the decoder transforms the residual value with the LFNST transform kernel.

It should be noted that, in the implementations of the present application, after the LFNST transform kernel candidate set is selected, the decoder can obtain the value of the LFNST index (lfnst_idx) by parsing the bitstream. Then, the decoder can select the transform matrix (transform kernel) indicated by lfnst_idx from the LFNST transform kernel candidate set according to the value of lfnst_idx. For example, when lfnst_idx is 1, the first transform matrix group can be used as the LFNST transform kernel in the decoding process. When lfnst_idx is 2, the second transform matrix group can be used as the LFNST transform kernel in the decoding process.

Furthermore, in the implementations of the present application, each transform matrix (transform kernel) group contains base transform matrices of two sizes, and the sizes of the base transform matrices used at the decoder side are 16×16 and 48×16. The selection is based on nLfnstOutSize. If nLfnstOutSize is 16, a 16×16 base transform matrix is selected. Alternatively, if nLfnstOutSize is 48, a 48×16 base transform matrix is selected. Alternatively, if nonZeroSize is 8, only the first 8 rows in the transform matrix are used for matrix multiplication calculation.

Furthermore, in the implementations of the present application, the secondary transform coefficient vector u[i] is used as input, and the transform matrix is multiplied with it to obtain the primary transform coefficient vector v[j], herein, i=0, 1, . . . , nonZeroSize−1, j=0, 1, . . . nLfnstOutSize−1. Assuming that the transform matrix obtained in the previous step is lowFreqTransMatrix, the specific calculation process of v[j] is as follows.

$$v[j] = Clip3\left(CoeffMin, CoeffMax, \left(\sum_{j=0}^{nonZeroSize-1} lowFreqTransMatrix[j][i] \times u[i] + 64\right) >> 7\right) \quad (15)$$

Clip3 is a clipping operation and used to restrict the value of the coefficient to be between the following two numbers, as illustrated below.

$$CoeffMin=-(1<<15) \quad (16)$$

$$CoeffMax=(1<<15)-1 \quad (17)$$

Furthermore, after the above matrix calculation, the transform coefficient can be transformed. Herein, for 4×4 LFNST, at the decoder side, 16 or 8 coefficients will be input and 16 coefficients will be output; for 8×8 LFNST, at the decoder side, 16 or 8 coefficients will be input, and 48 coefficients will be output, to achieve LFNST of the transform coefficient.

It can be seen, in the implementations of the present application, for the current block on which intra prediction is performed using the CCLM mode, the decoder introduces relevant information of the CCLM parameter in the process of performing LFNST on the current block for which the CCLM mode is used, and selects the transform set (or transform kernel) according to the CCLM information. Therefore, when the current block is transformed, it is not necessary to map the CCLM mode to the traditional intra prediction mode. Thereby, the applicability of the LFNST technology to the current block for which the CCLM mode is used can be improved, so that selection of the transform set (or transform kernel) is more flexible.

The present application provides the transform method, which is applied to the decoder. The decoder parses the bitstream, to determine the prediction mode parameter of the current block; parses the bitstream, to determine the CCLM parameter when the prediction mode parameter indicates that CCLM is used for the current block to determine the intra prediction value; parses the bitstream, to determine the transform coefficient of the current block and the LFNST index; determines the LFNST transform kernel used for the current block according to the CCLM parameter when the LFNST index indicates that LFNST is used for the current block; and transforms the transform coefficient with the LFNST transform kernel. It can be seen that, in the implementations of the present application, when performing transform on the current block on which intra prediction is performed using the CCLM mode, a codec does not need to map the CCLM mode to the traditional intra prediction mode. Instead, the codec can determine the LFNST transform kernel used for the current block directly according to the CCLM parameter corresponding to the current block, so that the LFNST transform kernel can be used to perform LFNST. Understandably, since the CCLM parameter is introduced in LFNST, selection of the LFNST transform kernel is more flexible, which can improve the applicability of the LFNST technology to the CCLM mode, simplify the transform process of the LFNST technology, and effectively improve the encoding efficiency.

Figure 19:
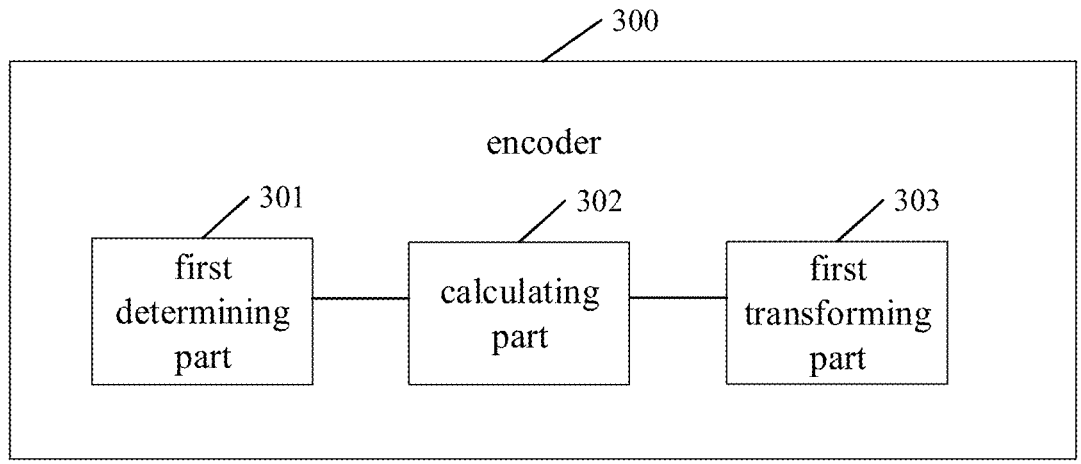
FIG. 19 is schematic diagram 1 of a structure of an encoder.

Based on the above implementations, in yet another implementation of the present application, FIG. 19 is schematic diagram 1 of a structure of an encoder. As illustrated in FIG. 19, the encoder 300 provided in the implementations of the present application includes a first determining part 301, a calculating part 302, and a first transforming part 303.

The first determining part 301 is configured to: determine a prediction mode parameter of a current block, determine a CCLM parameter when the prediction mode parameter indicates that CCLM prediction is used to determine an intra prediction value of the current block, and determine the intra prediction value of the current block according to the CCLM parameter.

The calculating part 302 is configured to calculate a residual value between the current block and the intra prediction value according to the CCLM parameter.

The first determining part 301 is further configured to: determine an LFNST transform kernel used for the current block according to the CCLM parameter, set an LFNST index, and signal the LFNST index into a bitstream of a video, when LFNST is used for the current block.

The first transforming part 303 is configured to transform the residual value with the LFNST transform kernel.

Figure 20:
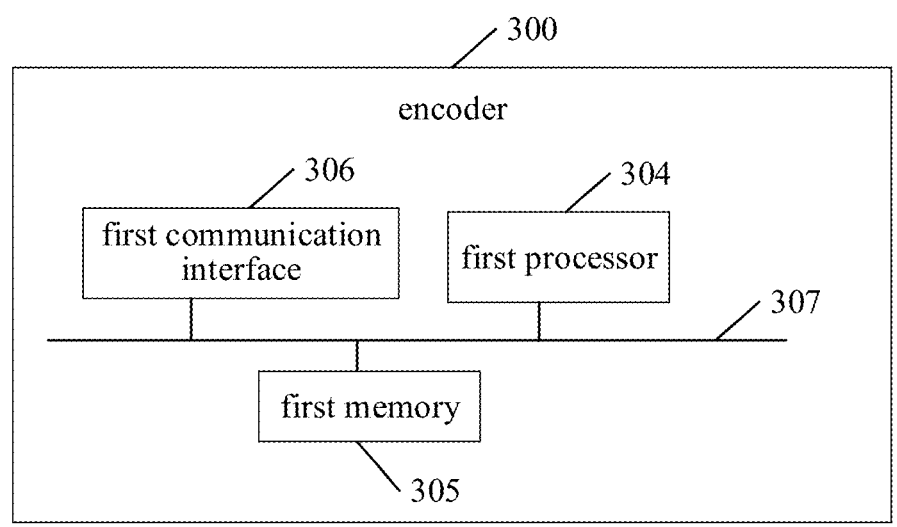
FIG. 20 is schematic diagram 2 of a structure of an encoder.

FIG. 20 is schematic diagram 2 of a structure of an encoder. As illustrated in FIG. 20, the encoder 300 provided in the implementations of the present application further includes a first processor 304, a first memory 305 storing instructions executable by the first processor 304, a first communication interface 306, and a first bus 307 for connecting the first processor 304, the first memory 305, and the first communication interface 306.

Furthermore, in the implementations of the present application, the first processor 304 is configured to: determine a prediction mode parameter of a current block; determine a CCLM parameter when the prediction mode parameter indicates that CCLM prediction is used for the current block to determine an intra prediction value; determine the intra prediction value of the current block according to the CCLM parameter, and calculate a residual value between the current block and the intra prediction value; determine an LFNST transform kernel used for the current block according to the CCLM parameter, set an LFNST index, and signal the LFNST index into a bitstream of a video, when LFNST is used for the current block; and transform the residual value with the LFNST transform kernel.

Furthermore, various functional units described in implementations herein may be integrated into one processing unit or may be present as a number of physically separated units, and two or more units may be integrated into one. The integrated unit may be implemented in the form of hardware or a software functional unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and the like) to perform all or part of the steps described in the various implementations of the present disclosure. The memory includes various medium capable of storing program codes, such as a universal serial bus (USB) flash disk, a read-only memory (ROM), a random access memory (RAM), a removable hard disk, disk, compact disc (CD), or the like.

The implementations of the present application provide the encoder. The encoder determines the prediction mode parameter of the current block; determines the CCLM parameter when the prediction mode parameter indicates that CCLM prediction is used for the current block to determine the intra prediction value; determines the intra prediction value of the current block according to the CCLM parameter, and calculates the residual value between the current block and the intra prediction value; determines the LFNST transform kernel used for the current block according to the CCLM parameter, sets the LFNST index, and signals the LFNST index into the bitstream of the video, when LFNST is used for the current block; and transforms the residual value with the LFNST transform kernel. It can be seen that, in the implementations of the present application, when performing transform on the current block on which intra prediction is performed using the CCLM mode, a codec does not need to map the CCLM mode to the traditional intra prediction mode. Instead, the codec can determine the LFNST transform kernel used for the current block directly according to the CCLM parameter corresponding to the current block, so that the LFNST transform kernel can be used to perform LFNST. Understandably, since the CCLM parameter is introduced in LFNST, selection of the LFNST transform kernel is more flexible, which can improve the applicability of the LFNST technology to the CCLM mode, simplify the transform process of the LFNST technology, and effectively improve the encoding efficiency.

Figure 21:
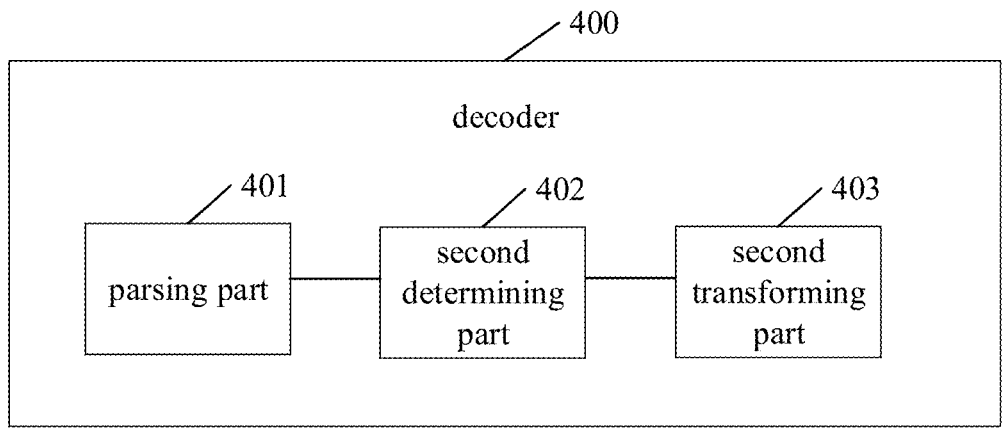
FIG. 21 is schematic diagram 1 of a structure of a decoder.

FIG. 21 is schematic diagram 1 of a structure of a decoder. As illustrated in FIG. 21, the decoder 400 provided in the implementations of the present application includes a parsing part 401, a second determining part 402, and a second transforming part 403.

The parsing part 401 is configured to: parse a bitstream, to determine a prediction mode parameter of a current block, and parse the bitstream when the prediction mode parameter indicates that CCLM is used for the current block to determine an intra prediction value.

The second determining part 402 is configured to: determine a CCLM parameter, parse the bitstream, to determine a transform coefficient of the current block and an LFNST index, and determine an LFNST transform kernel used for the current block according to the CCLM parameter when the LFNST index indicates that LFNST is used for the current block.

The second transforming part 403 is configured to transform the transform coefficient with the LFNST transform kernel.

Figure 22:
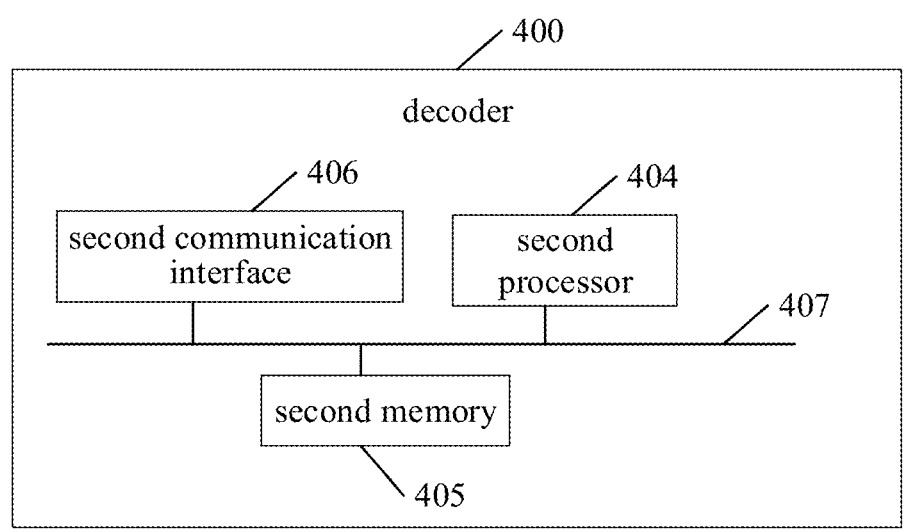
FIG. 22 is schematic diagram 2 of a structure of a decoder.

FIG. 22 is schematic diagram 2 of a structure of a decoder. As illustrated in FIG. 22, the decoder 400 provided in the implementations of the present application can further include a second processor 404, a second memory 405 storing instructions executable by the second processor 404, a second communication interface 406, and a second bus 407 for connecting the second processor 404, the first memory 405 and the second communication interface 406.

Furthermore, in the implementations of the present application, the above second processor 404 is configured to: parse a bitstream to determine a prediction mode parameter of a current block; parse the bitstream to determine a CCLM parameter when the prediction mode parameter indicates that CCLM is used for the current block to determine an intra prediction value; parse the bitstream to determine a transform coefficient of the current block and an LFNST index; determine an LFNST transform kernel used for the current block according to the CCLM parameter when the LFNST index indicates that LFNST is used for the current block; and transform the transform coefficient with the LFNST transform kernel.

Furthermore, various functional units described in implementations herein may be integrated into one processing unit or may be present as a number of physically separated units, and two or more units may be integrated into one. The integrated unit may be implemented in the form of hardware or a software functional unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and the like) to perform all or part of the steps described in the various implementations of the present disclosure. The memory includes various medium capable of storing program codes, such as a USB flash disk, an ROM, an RAM, a removable hard disk, disk, CD, or the like.

The implementations of the present application provide the decoder. The decoder parses the bitstream, to determine the prediction mode parameter of the current block; parses the bitstream, to determine the CCLM parameter when the prediction mode parameter indicates that CCLM is used for the current block to determine the intra prediction value; parses the bitstream, to determine the transform coefficient of the current block and the LFNST index; determines the LFNST transform kernel used for the current block according to the CCLM parameter when the LFNST index indicates that LFNST is used for the current block; and transforms the transform coefficient with the LFNST transform kernel. It can be seen that, in the implementations of the present application, when performing transform on the current block on which intra prediction is performed using the CCLM mode, a codec does not need to map the CCLM mode to the traditional intra prediction mode. Instead, the codec can determine the LFNST transform kernel used for the current block directly according to the CCLM parameter corresponding to the current block, so that the LFNST transform kernel can be used to perform LFNST. Understandably, since the CCLM parameter is introduced in LFNST, selection of the LFNST transform kernel is more flexible, which can improve the applicability of the LFNST technology to the CCLM mode, simplify the transform process of the LFNST technology, and effectively improve the encoding efficiency.

Implementations of the present application provide a computer-readable storage medium and a computer-readable storage medium. The computer-readable storage medium stores a program, and when executed by a processor, the program implements the method described in the above implementations.

Specifically, a program instruction corresponding to a transform method in the implementation may be stored in a storage medium such as an optical disk, a hard disk, and a U disk. When the program instruction corresponding to the transform method in the storage medium is read or executed by an electronic device, the following steps are included.

A prediction mode parameter of a current block is determined. A CCLM parameter is determined when the prediction mode parameter indicates that CCLM prediction is used for the current block to determine an intra prediction value. The intra prediction value of the current block is determined according to the CCLM parameter, and a residual value between the current block and the intra prediction value is calculated. An LFNST transform kernel used for the current block is determined according to the CCLM parameter, an LFNST index is set, and the LFNST index is signalled into a bitstream of a video, when LFNST is used for the current block. The residual value is transformed with the LFNST transform kernel.

Specifically, a program instruction corresponding to a transform method in the implementation may be stored in a storage medium such as an optical disk, a hard disk, and a U disk. When the program instruction corresponding to the transform method in the storage medium is read or executed by an electronic device, the following steps are included.

A bitstream is parsed to determine a prediction mode parameter of a current block. The bitstream is parsed to determine a CCLM parameter when the prediction mode parameter indicates that CCLM is used for the current block to determine an intra prediction value. The bitstream is parsed to determine a transform coefficient of the current block and an LFNST index. An LFNST transform kernel used for the current block is determined according to the CCLM parameter when the LFNST index indicates that LFNST is used for the current block. The transform coefficient is transformed with the LFNST transform kernel.

Those skilled in the art will understand that implementations herein can provide a method, a system, or a computer program product. Therefore, the disclosure may have hardware-only implementations, software-only implementations, or software plus hardware implementations. In addition, the disclosure may be implemented in the form of a computer program product embodied on one or more computer usable storage media (including but not limited to a magnetic storage device, an optical memory, and the like) including computer usable program codes.

The disclosure is described herein with reference to schematic flowcharts and/or block diagrams of methods, apparatuses (systems), and computer program products according to the implementations of the disclosure. It should be understood that each flow and/or block in the flowchart and/or block diagram, and a combination of flow and/or block in the flowchart and/or block diagram can be implemented by computer program instructions. These computer program instructions may be provided to a general purpose computer, a special purpose computer, an embedded processor or a processor of other programmable data processing apparatuses to form a machine, such that devices for implementing functions specified by one or more flows in the flowchart and/or one or more blocks in the block diagram may be generated by executing the instructions with the processor of the computer or other programmable data processing apparatuses.

The computer program instructions may also be stored in a computer-readable memory that can direct the computer or other programmable data processing apparatuses to operate in a given manner, so that the instructions stored in the computer-readable memory produce a manufactured article including an instruction device, and the instruction device implements the functions specified by one or more flows in the flowchart and/or one or more blocks in the block diagram.

The computer program instructions may also be loaded onto the computer or other programmable data processing apparatuses, such that a series of process steps may be executed on the computer or other programmable apparatuses to produce processing implemented by the computer, so that the instructions executed on the computer or other programmable apparatuses provide steps for implementing the functions specified by one or more flows in the flowchart and/or one or more blocks in the block diagram.

The above are only some implementations of the present application and is not used to limit the protection scope of the present application.

INDUSTRIAL APPLICABILITY

The transform method, the encoder, the decoder, and the storage medium are provided in the implementations of the present application. The encoder determines the prediction mode parameter of the current block; determines the CCLM parameter when the prediction mode parameter indicates that CCLM prediction is used for the current block to determine the intra prediction value; determines the intra prediction value of the current block according to the CCLM parameter, and calculates the residual value between the current block and the intra prediction value; determines the LFNST transform kernel used for the current block according to the CCLM parameter, sets the LFNST index, and signals the LFNST index into the bitstream of the video, when LFNST is used for the current block; and transforms the residual value with the LFNST transform kernel. The decoder parses the bitstream, to determine the prediction mode parameter of the current block; parses the bitstream, to determine the CCLM parameter when the prediction mode parameter indicates that CCLM is used for the current block to determine the intra prediction value; parses the bitstream, to determine the transform coefficient of the current block and the LFNST index; determines the LFNST transform kernel used for the current block according to the CCLM parameter when the LFNST index indicates that LFNST is used for the current block; and transforms the transform coefficient with the LFNST transform kernel. It can be seen that, in the implementations of the present application, when performing transform on the current block on which intra prediction is performed using the CCLM mode, a codec does not need to map the CCLM mode to the traditional intra prediction mode. Instead, the codec can determine the LFNST transform kernel used for the current block directly according to the CCLM parameter corresponding to the current block, so that the LFNST transform kernel can be used to perform LFNST. Understandably, since the CCLM parameter is introduced in LFNST, selection of the LFNST transform kernel is more flexible, which can improve the applicability of the LFNST technology to the CCLM mode, simplify the transform process of the LFNST technology, and effectively improve the encoding efficiency.

What is claimed is:
1. A transform method, for an encoder and comprising:
determining a prediction mode parameter of a current block;
determining a cross-component linear model (CCLM) parameter when the prediction mode parameter indicates that CCLM prediction is used for the current block to determine an intra prediction value;
signalling the prediction mode parameter of the current block and the CCLM parameter into a bitstream of a video;
determining the intra prediction value of the current block according to the CCLM parameter, and calculating a residual value between the current block and the intra prediction value;
determining a low-frequency non-separable transform (LFNST) transform kernel used for the current block according to the CCLM parameter, setting an LFNST index, and signalling the LFNST index into the bitstream of the video, when LFNST is used for the current block; and
transforming the residual value with the LFNST transform kernel;
wherein the CCLM parameter comprises a CCLM mode index, wherein the CCLM mode index indicates a CCLM mode used for the current block, and the CCLM mode indicates the use of CCLM to determine a calculation derivation manner of the intra prediction value of the current block;
wherein "determining the LFNST transform kernel used for the current block according to the CCLM parameter, setting the LFNST index, and signalling the LFNST index into the bitstream of the video, when LFNST is used for the current block" comprises:

selecting one LFNST transform kernel candidate set from a plurality of LFNST transform kernel candidate sets according to a value of the CCLM mode index;

selecting from the selected LFNST transform kernel candidate set a transform kernel indicated by the LFNST index as the LFNST transform kernel used for the current block; and setting a value of the LFNST index, wherein the value of the LFNST index indicates that LFNST is used for the current block and indicates an index of the LFNST transform kernel in the LFNST transform kernel candidate set, wherein the LFNST transform kernel candidate set contains two or more preset LFNST transform kernels; and wherein selecting one LFNST transform kernel candidate set from the plurality of LFNST transform kernel candidate sets according to the value of the CCLM mode index comprises:

determining a value of an LFNST transform kernel candidate set index corresponding to the value of the CCLM mode index through a second look-up table, and selecting an LFNST transform kernel candidate set indicated by the value of the LFNST transform kernel candidate set index as the selected LFNST transform kernel candidate set, wherein the second look-up table at least contains different CCLM mode indexes corresponding to LFNST transform kernel candidate set indexes with different values, wherein the different CCLM mode indexes at least indicate INTRA_LT_CCLM, INTRA_L_CCLM, and INTRA_T_CCLM and each CCLM mode index corresponds to a different LFNST transform kernel candidate set index.

2. A transform method, for a decoder and comprising:
parsing a bitstream to determine a prediction mode parameter of a current block;
parsing the bitstream to determine a cross-component linear model (CCLM) parameter when the prediction mode parameter indicates that CCLM is used for the current block to determine an intra prediction value;
parsing the bitstream to determine a transform coefficient of the current block and a low-frequency non-separable transform (LFNST) index;
determining an LFNST transform kernel used for the current block according to the CCLM parameter when the LFNST index indicates that LFNST is used for the current block; and
transforming the transform coefficient with the LFNST transform kernel;
wherein the CCLM parameter comprises a CCLM mode index, where in the CCLM mode index indicates a CCLM mode used for the current block, and the CCLM mode indicates the use of CCLM to determine a calculation derivation manner of the intra prediction value of the current block;
wherein "determining the LFNST transform kernel used for the current block according to the CCLM parameter when the LFNST index indicates that LFNST is used for the current block" comprises:
selecting one LFNST transform kernel candidate set from a plurality of LFNST transform kernel candidate sets according to a value of the CCLM mode index; and
selecting from the selected LFNST transform kernel candidate set a transform kernel indicated by the LFNST index as the LFNST transform kernel used for the current block, wherein the LFNST transform kernel candidate set contains two or more preset LFNST transform kernels; and wherein selecting one LFNST transform kernel candidate set from the plurality of LFNST transform kernel candidate sets according to the value of the CCLM mode index comprises:

determining a value of an LFNST transform kernel candidate set index corresponding to the value of the CCLM mode index through a second look-up table, and selecting an LFNST transform kernel candidate set indicated by the value of the LFNST transform kernel candidate set index as the selected LFNST transform kernel candidate set, wherein the second look-up table at least contains different CCLM mode indexes corresponding to LFNST transform kernel candidate set indexes with different values, wherein the different CCLM mode indexes at least indicate INTRA_LT_CCLM, INTRA_L_CCLM, and INTRA_T_CCLM and each CCLM mode index corresponds to a different LFNST transform kernel candidate set index.

3. A decoder, comprising:
at least one processor; and
a memory coupled to the at least one processor and storing at least one computer executable instruction thereon which, when executed by the at least one processor, causes the at least one processor to:
parse a bitstream to determine a prediction mode parameter of a current block;
parse the bitstream to determine a cross-component linear model (CCLM) parameter when the prediction mode parameter indicates that CCLM is used for the current block to determine an intra prediction value;
parse the bitstream to determine a transform coefficient of the current block and a low-frequency non-separable transform (LFNST) index;
determine an LFNST transform kernel used for the current block according to the CCLM parameter when the LFNST index indicates that LFNST is used for the current block; and
transform the transform coefficient with the LFNST transform kernel;
wherein the CCLM parameter comprises a CCLM mode index, wherein the CCLM mode index indicates a CCLM mode used for the current block, and the CCLM mode indicates the use of CCLM to determine a calculation derivation manner of the intra prediction value of the current block;
wherein the at least one processor configured to determine the LFNST transform kernel used for the current block according to the CCLM parameter when the LFNST index indicates that LFNST is used for the current block is configured to:
select one LFNST transform kernel candidate set from a plurality of LFNST transform kernel candidate sets according to a value of the CCLM mode index; and
select from the selected LFNST transform kernel candidate set a transform kernel indicated by the LFNST index as the LFNST transform kernel used for the current block, wherein the LFNST transform kernel candidate set contains two or more preset LFNST transform kernels; and wherein the at least one processor configured to select one LFNST transform kernel candidate set from the plurality of LFNST transform kernel candidate sets according to the value of the CCLM mode index is configured to:
determine a value of an LFNST transform kernel candidate set index corresponding to the value of the CCLM mode index through a second look-up table, and select an LFNST transform kernel candidate set indicated by the value of the LFNST transform kernel candidate set index as the selected LFNST transform kernel candidate set, wherein
the second look-up table at least contains different CCLM mode indexes corresponding to LFNST transform kernel candidate set indexes with different values, wherein the different CCLM mode indexes at least indicate INTRA_LT_CCLM, INTRA_L_CCLM, and INTRA_T_CCLM and each CCLM mode index corresponds to a different LFNST transform kernel candidate set index.

* * * * *